(12) United States Patent
Mirzaei et al.

(10) Patent No.: US 9,113,077 B2
(45) Date of Patent: Aug. 18, 2015

(54) ORIENTATION DETERMINATION BASED ON VANISHING POINT COMPUTATION

(71) Applicant: QUALCOMM Incorporated, San Diego, CA (US)

(72) Inventors: Faraz Mohammad Mirzaei, San Jose, CA (US); Hui Chao, San Jose, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 13/744,217

(22) Filed: Jan. 17, 2013

(65) Prior Publication Data

US 2014/0198227 A1    Jul. 17, 2014

(51) Int. Cl.
*H04N 5/232* (2006.01)
*G01C 21/12* (2006.01)
*G01C 21/20* (2006.01)
*G06K 9/32* (2006.01)
*G06T 7/00* (2006.01)

(52) U.S. Cl.
CPC ............ *H04N 5/23248* (2013.01); *G01C 21/12* (2013.01); *G01C 21/206* (2013.01); *G06K 9/3208* (2013.01); *G06T 7/0042* (2013.01); *H04N 5/23258* (2013.01); *G06T 2207/30244* (2013.01)

(58) Field of Classification Search
CPC   H04N 5/232; H04N 5/23248; H04N 5/23258
USPC ............... 348/208.2, 187, 36, 42, 46
See application file for complete search history.

(56) References Cited

U.S. PATENT DOCUMENTS

| | | | |
|---|---|---|---|
| 5,739,848 A | 4/1998 | Shimoura et al. | |
| 6,591,005 B1* | 7/2003 | Gallagher | 382/154 |
| 2004/0071207 A1* | 4/2004 | Skidmore et al. | 375/233 |
| 2005/0259882 A1* | 11/2005 | Dewaele | 382/243 |
| 2006/0078214 A1* | 4/2006 | Gallagher | 382/254 |
| 2009/0208128 A1* | 8/2009 | Hayashi et al. | 382/256 |
| 2010/0208057 A1* | 8/2010 | Meier et al. | 348/135 |
| 2010/0295948 A1* | 11/2010 | Xie et al. | 348/175 |
| 2010/0321489 A1* | 12/2010 | Chen et al. | 348/116 |
| 2011/0069152 A1* | 3/2011 | Wang et al. | 348/43 |
| 2011/0115902 A1* | 5/2011 | Jiang et al. | 348/135 |

(Continued)

FOREIGN PATENT DOCUMENTS

WO     2013180840     12/2013

OTHER PUBLICATIONS

Barnard, "Interpreting perspective images", Artificial Intelligence, Nov. 1983, pp. 435-462.

(Continued)

*Primary Examiner* — Nicholas Giles
*Assistant Examiner* — Abdelaaziz Tissire
(74) *Attorney, Agent, or Firm* — Hunter Clark PLLC

(57) ABSTRACT

Disclosed are systems, apparatus, devices, methods, computer program products, and other implementations, including a method that includes capturing an image of a scene by an image capturing unit of a device that includes an accelerometer, and determining orientation of the device based, at least in part, on determined location of a vanishing point (e.g., a single vanishing point) in the captured image of the scene and at least one measurement obtained from the accelerometer.

36 Claims, 12 Drawing Sheets

(56) References Cited

U.S. PATENT DOCUMENTS

| | | | |
|---|---|---|---|
| 2012/0141015 A1* | 6/2012 | Yu et al. .................. | 382/154 |
| 2012/0224062 A1 | 9/2012 | Lacoste et al. | |
| 2012/0287233 A1* | 11/2012 | Wang et al. .................. | 348/42 |
| 2013/0114851 A1* | 5/2013 | Foote et al. .................. | 382/103 |
| 2013/0286221 A1* | 10/2013 | Shechtman et al. .......... | 348/187 |
| 2013/0322767 A1* | 12/2013 | Chao et al. .................. | 382/199 |
| 2014/0104437 A1* | 4/2014 | Chao et al. .................. | 348/187 |
| 2014/0104445 A1* | 4/2014 | Ramachandran et al. . | 348/208.2 |

OTHER PUBLICATIONS

Craig, "Introduction to Robotics: Mechanics and Control", Pearson Prentice Hall, 2005, pp. 374-376.

Hartley, et al., "Multiple View Geometry in Computer Vision", Cambridge University Press, 2003, pp. 611-614.

Lobo, et al., "Fusing of image and inertial sensing for camera calibration", Multisensor Fusion and Integration for Intelligent Systems, 2001, pp. 103-108.

Mirzaei, et al., "Optimal Estimation of Vanishing Points in a Manhattan World", Proceedings, IEEE International Conference on Computer Vision, 2011, pp. 2454-2461.

Tardif J.P., "Non-iterative approach for fast and accurate vanishing point detection", Proceedings, International Conference on Computer Vision, 2009, pp. 1250-1257.

Dias J. et al., "Vision and inertial sensor cooperation using gravity as a vertical reference", Transactions on Pattern Analysis and Machine Intelligence, IEEE, Piscataway, USA, Dec. 2003, vol. 25, No. 12, pp. 1597-1608, XP011103927, ISSN: 0162-8828, DOI: 10.1109/TPAMI.2003.1251152.

International Search Report and Written Opinion—PCT/US2013/074641—ISA/EPO—Apr. 10, 2014.

Zhou S., et al., "Real-time hand-writing tracking and recognition by integrated micro motion and vision sensors platform", Robotics and Biomimetics (ROBIO), 2012 IEEE International Conference on, IEEE , Dec. 11, 2012, pp. 1747-1752, XP032353031, DOI: 10.1109/ROBIO.2012.6491220 ISBN: 978-1-4673-2125-9 p. 1748, left-hand column, paragraph 3—p. 1749, left-hand column, paragraph 1 figure 2.

Written Opinion of the International Preliminary Examining Authority—PCT/US2013/074641—IPEA/EPO—Dec. 3, 2014, 6 pgs.

International Preliminary Report on Patentability—PCT/US2013/074641, The International Bureau of WIPO—Geneva, Switzerland, May 11, 2015, 25 pgs.

* cited by examiner

ORIENTATION DETERMINATION BASED ON VANISHING POINT COMPUTATION

BACKGROUND

Various applications and procedures performed by a mobile device require knowledge of the device's orientation. For example, location estimation can be performed by combining measurements of an odometer/pedometer with estimates of the device's heading (i.e., its orientation). In another example, knowledge of a device's orientation/heading may be used to calibrate various on-board sensors.

SUMMARY

In some variations, a method is disclosed. The method includes capturing an image of a scene by an image capturing unit of a device that includes an accelerometer, and determining an orientation of the device based, at least in part, on a determined location of a vanishing point in the captured image of the scene and at least one measurement obtained from the accelerometer.

Embodiments of the method may include at least some of the features described in the present disclosure, including one or more of the following features.

Determining the orientation of the device based on the determined location of the vanishing point and the at least one measurement obtained from the accelerometer may include determining the orientation based, at least in part, on determined location of a single vanishing point in the captured image and the at least one measurement obtained from the accelerometer.

The method may further include obtaining the at least one measurement from the accelerometer, and determining a gravity vector based, at least in part, on the at least one measurement from the accelerometer.

Determining the orientation of the device may include determining the orientation of the device relative to a frame of reference of a closed structure in which the device is located.

The method may further include normalizing a vector corresponding to the determined location of the vanishing point based on an intrinsic calibration matrix of the image capturing unit.

The method may further include aligning an axis of the frame of reference of the closed structure to the normalized vanishing point vector, and determining the orientation of the device based on the aligned axis of the frame of reference of the closed structure.

Determining the orientation of the device may include deriving a rotation matrix to transform location coordinates in the frame of reference of the closed structure to a frame of reference of the image capturing unit of the device.

The method may further include determining based on the rotation matrix one or more of, for example, roll of the device, pitch of the device, and/or yaw of the device.

The method may further include performing QR decomposition on the rotation matrix to obtain a resultant orthonormal rotation matrix.

Determining the orientation of the device may include determining the orientation of the device based on determined location of another vanishing point in response to a determination that the determined vanishing point location corresponds to a vector that is substantially vertical.

Determining the orientation of the device may include identifying line segments in the captured image of the scene, and determining the location of the vanishing point in the captured image based on the identified line segments.

In some variations, a device is disclosed. The device includes an image capturing unit, an accelerometer, and a controller. The controller is configured to determine a location of a vanishing point in an image of a scene captured by the image capturing unit, obtain at least one measurement performed by the accelerometer, and determine an orientation of the device based, at least in part, on the determined location of the vanishing point in the captured image of the scene and the at least one measurement obtained from the accelerometer.

Embodiments of the device may include at least some of the features described in the present disclosure, including at least some of the features described above in relation to the method, as well as one or more of the following features.

The controller configured to determine the orientation of the device based on the determined location of the vanishing point and the at least one measurement obtained from the accelerometer may be configured to determine the orientation based, at least in part, on determined location of a single vanishing point in the captured image and the at least one measurement obtained from the accelerometer.

The controller may further be configured to determine a gravity vector based, at least in part, on the at least one measurement obtained from the accelerometer.

The controller configured to determine the orientation of the device may be configured to determine the orientation of the device relative to a frame of reference of a closed structure in which the device is located.

The controller configured to determine the orientation of the device may be configured to derive a rotation matrix to transform location coordinates in the frame of reference of the closed structure to a frame of reference of the image capturing unit of the device.

The controller may be further configured to determine based on the rotation matrix one or more of, for example, roll of the device, pitch of the device, and/or yaw of the device.

The controller may be further configured to normalize a vector corresponding to the determined location of the vanishing point based on an intrinsic calibration matrix of the image capturing unit.

The controller configured to determine the orientation of the device may be configured to determine the orientation of the device based on determined location of another vanishing point in response to a determination that the determined vanishing point location corresponds to a vector that is substantially vertical.

The controller configured to determine the orientation of the device may be configured to identify line segments in the captured image of the scene, and determine the location of the vanishing point in the captured image based on the identified line segments.

In some variations, an apparatus is disclosed. The apparatus includes means for capturing an image of a scene, and means for determining an orientation of a device that includes an accelerometer based, at least in part, on a determined location of a vanishing point in the captured image of the scene and at least one measurement obtained from the accelerometer.

Embodiments of the apparatus may include at least some of the features described in the present disclosure, including at least some of the features described above in relation to the method and the device, as well as one or more of the following features.

The means for determining the orientation of the device based on the determined location of the vanishing point and the at least one measurement obtained from the accelerometer may include means for determining the orientation based, at least in part, on determined location of a single vanishing point in the captured image and the at least one measurement obtained from the accelerometer.

The apparatus may further include means for obtaining the at least one measurement from the accelerometer, and means for determining a gravity vector based, at least in part, on the at least one measurement from the accelerometer.

The means for determining the orientation of the device may include means for determining the orientation of the device relative to a frame of reference of a closed structure in which the device is located.

The means for determining the orientation of the device may include means for deriving a rotation matrix to transform location coordinates in the frame of reference of the closed structure to a frame of reference of the means for capturing the image.

The apparatus may further include means for determining based on the rotation matrix one or more of, for example, roll of the device, pitch of the device, and/or yaw of the device.

The apparatus may further include means for normalizing a vector corresponding to the determined location of the vanishing point based on an intrinsic calibration matrix of the means for capturing the image.

The means for determining the orientation of the device may include means for determining the orientation of the device based on determined location of another vanishing point in response to a determination that the determined vanishing point location corresponds to a vector that is substantially vertical.

The means for determining the orientation of the device may include means for identifying line segments in the captured image of the scene and means for determining the location of the vanishing point in the captured image based on the identified line segments.

In some variations, a non-transitory processor readable media is disclosed. The processor readable media is programmed with a set of instructions executable on a processor that, when executed, cause operations including capturing an image of a scene by an image capturing unit of a device that includes an accelerometer, and determining an orientation of the device based, at least in part, on a determined location of a vanishing point in the captured image of the scene and at least one measurement obtained from the accelerometer.

Embodiments of the processor readable media may include at least some of the features described in the present disclosure, including at least some of the features described above in relation to the method, the device, and the apparatus.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Other and further objects, features, aspects, and advantages of the present disclosure will become better understood with the following detailed description of the accompanying drawings.

DETAILED DESCRIPTION

Described herein are systems, apparatus, devices, methods, computer program products and other implementations, including a method that includes capturing an image of a scene by an image capturing unit of a device that includes an accelerometer, and determining orientation of the device based, at least in part, on determined location of a vanishing point in the captured image of the scene (e.g., a single vanishing point in the captured image) and at least one measurement obtained from the accelerometer.

Figure 1:
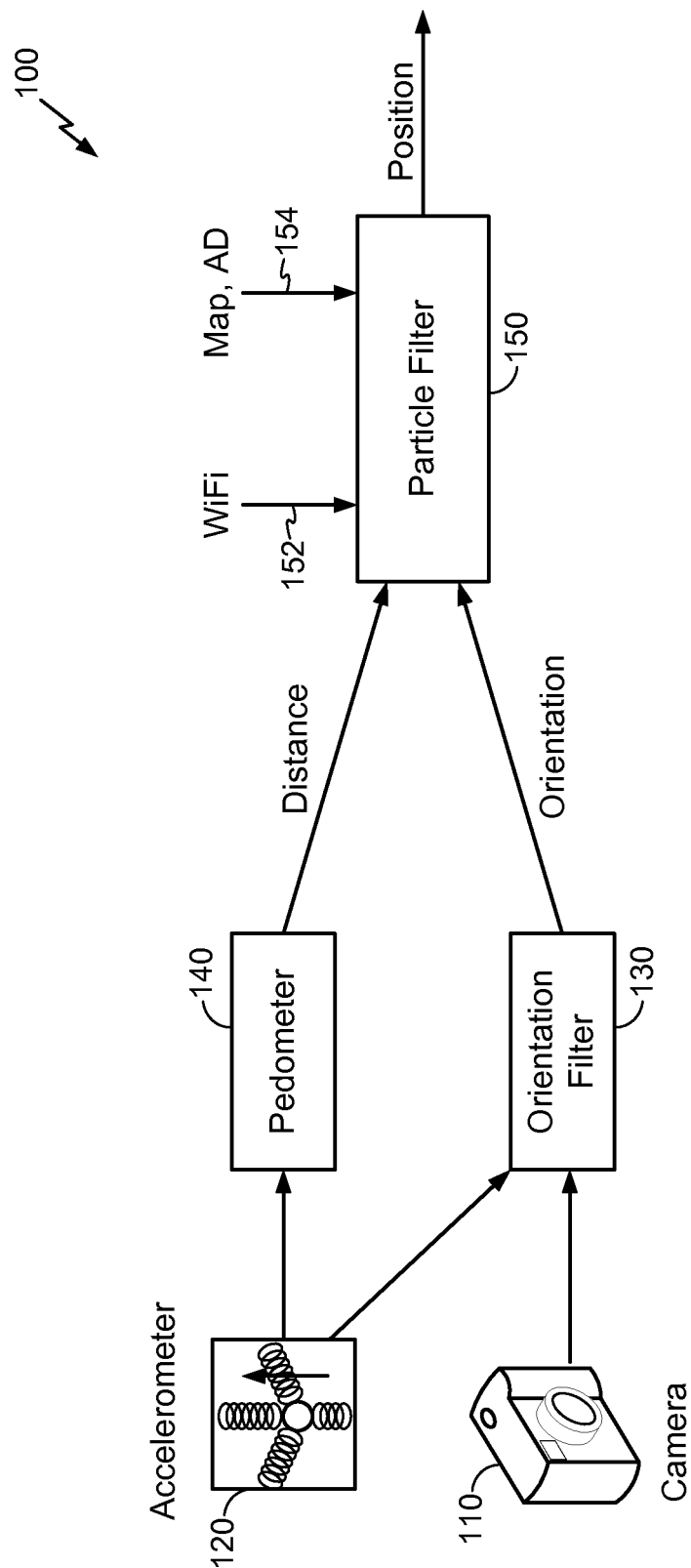
FIG. 1 is a schematic diagram of an example positioning determination system with an orientation filter to determine orientation of the system.

With reference to FIG. 1, a schematic diagram of an example positioning determination system 100 (also referred to as a localization engine) that includes an orientation filter to determine the system's orientation (e.g., heading) is shown.

The various modules/components of the system 100 are schematically depicted as separate units/modules/components, but those units/modules/components may, in some embodiments, be part of a device, such as a mobile device. The system 100 is configured to determine position (e.g., of a device) based on at least one measurement performed by an accelerometer and determined location of a vanishing point in an image captured by an image capturing unit (schematically illustrated in FIG. 1 as a camera 110) of a scene. Although in FIG. 1 the system orientation is determined to facilitate position determination for the system, the determined orientation may be used for other applications, purposes, and uses. The camera 110 may, in some embodiments, be an onboard camera included with a mobile device, such as a charge-coupled device (CCD)-type camera, a CMOS-type camera, etc. The system 100 also includes an accelerometer 120, such as a 3-D accelerometer implemented, in some embodiments, based on micro-electro-mechanical-system (MEMS) technology. In some embodiments, a 3-D accelerometer, such as the accelerometer 120, may be implemented using, for example, three (3) 1-D accelerometers. In some embodiments, the system 100 may include more than one 3-D accelerometers. The accelerometer 120 is configured to sense/measure linear motion, i.e., translation in a plane, such as a local horizontal plane, that can be measured with reference to at least two axes. Such an accelerometer is also configured to measure of an object's tilt. Thus, with a single 3D accelerometer, an object's motion in Cartesian coordinate space (x, y, z) can be sensed, as well as and the direction of gravity, which indicates the downward direction for the accelerometer (and thus for a device to which the accelerometer 120 is connected or in which it is enclosed).

At least one measurement from the accelerometer 120 and the image captured by the camera 110 (and/or data processed from the image) are communicated to a processor or controller (referred to as an orientation filter 130 in FIG. 1) that is configured to determine the relative orientation of the camera (or any other type of image capturing unit/device) based on the data provided by the accelerometer and the camera. For example, and as will be discussed in greater details below, the orientation filter 130 may be configured to determined location of a vanishing point (e.g., a single vanishing point determined from the captured image of the scene), to extract/determine a gravity vector from a measurement provided by the accelerometer 120, and to determine a rotation matrix based on a vanishing point vector for the determined vanishing point location and the gravity vector. The rotation matrix establishes the relationship between the real-world coordinates and the camera coordinate system. It is to be noted that although it may be possible to identify and determine multiple vanishing points in the captured image, with those multiple vanishing point used to determine the relative orientation of the camera 110, determining vanishing points is generally a more time and resource consuming procedure than extracting a gravity vector from a measurement(s) performed by an accelerometer. Thus, computing just a single vanishing point (and its corresponding vector), along with determining the gravity vector of the device, to determine the camera's orientation may expedite and preserve resources (power resources, processing resources, etc.) compared to determining the orientation from multiple vanishing points.

The measurements performed by the accelerometer 120 are also provided to a pedometer (or an odometer) 140 configured to estimate distance traveled by a device that includes the system 100. In some embodiments, the pedometer may be configured to detect peaks in raw accelerometer data, with each peak associated with a probability of corresponding to a directional step based on a slope of the peak, magnitude of acceleration change between a peak and a valley in the raw data, time elapsed since the last step, etc. The number of steps and an assumed stride length is used calculate the distance the user has moved. As further depicted in FIG. 1, in some implementations, the estimated distance determined by the pedometer 140 and the relative orientation determined by the orientation filter 130 may be communicated to a positioning engine, also referred to as a particle filter 150, to estimate the location of the device that includes the system 100. The particle filter 150 may implement an indirect mechanism to determine an estimated location, and may perform indirect measurements, predictive procedures, mobility models, etc. Determination of location estimates of a device (mobile device) or a trajectory or a path of the mobile device within, for example, a closed structure such as an indoor area may be enabled or enhanced using one or more probabilistic mechanisms. For example, a position of a mobile device may be represented as a probability distribution. To model a device's movement within a physical indoor area, a probability distribution may be propagated around a schematic map modeling or representing the physical indoor area. To implement a probabilistic mechanism, a Bayesian or smoothing filter may be applied to location estimates or to a process to determine location estimates. Implementation of a probabilistic mechanism may include consideration of a current location or trajectory of a mobile device. Additionally or alternatively, a Kalman filter or a particle filter may be applied to location estimates or a process to determine location estimates. Other probabilistic mechanisms may also be used. In some implementations, a mobile device's location(s) or estimated locations may be represented by multiple particles. Each particle may represent a possible state or location of a mobile device. A combination of multiple particles (e.g., an average, a centroid, a mean, etc., with an error or confidence range that is derived from a combination of multiple particles) of a particle cloud may be considered at least one estimated location of a mobile device. One or more individual particles of multiple particles of a particle cloud may be considered at least one estimated location of a mobile device. In response to movement of a mobile device, particles may be propagated according to a probability distribution. Particles may be propagated in accordance with a probability distribution further along a corridor, around a corner, by branching at an intersection, by taking a portal (e.g., a stairway, an escalator, an elevator, etc.) to a different floor, or any combination thereof, etc.

Thus, a user carrying a mobile device may travel within an indoor environment. To provide the user with a location-based service via, for example, a navigational application, an estimated position of a mobile device within an indoor environment may be determined by a positioning engine of the mobile device. A current estimated location of a mobile device may be estimated, for example, via a position fix obtained using one or more location determination procedure, such as multilateration techniques, based on signals received from remote devices (e.g., access points) via one or more transceivers. For example, the particle filter 150 may process signals received from one or more WiFi-based wireless access points in communication with the system 100 (via an example WiFi transceiver 152), and based on those signals determine an initial location of the device. If the system 100 cannot subsequently receive signals or other information from which it can determine its location (e.g., because the system 100 may be traveling in an indoor environment where such signals are not available), estimates of the device's location may be determined based on the last position determined using signals/information from remote devices/systems, the distance traveled (as provided by a pedometer such as the pedometer 140), and the determined orientation (as determined by the orientation filter 130). Additionally, in some embodiments, determination of the location of the system 100 (or of a device that includes the system 100) is further facilitated by assistance data (e.g., local maps), indicated as assistance data 154, that is provided from an assistance data database. For example, the position of the system determined using signals/information from remote devices/systems, as well as estimated locations of the system 100 determined using the particle filter 150, may be provided in terms of a local coordinate system corresponding to local maps provided from as assistance data database. Furthermore, the determined estimated location of the system may be presented on such local maps obtained from an assistance data database.

Thus, using the location estimation procedure implemented by the particle filter 150, a number of particles may be established and permitted to move around an indoor area, from a determined starting point or position, based on one or more conditions or properties for a current epoch that extends for a given duration of time. By way of example only, hundreds of particles may be propagated for two to four seconds per epoch. Absent other indications, a likelihood that one or more particles are to move to any given point of a set of adjacent or equally-proximate points may be equal. However, given a layout of an indoor area, it may become apparent that a mobile device is actually more likely to be located at or moving to some points as compared to other points. Indoor areas, such as office buildings or malls, may include hallways and rooms, for example. In an office environment, rooms may include common rooms (e.g., a break room, a conference room, etc.) or individual rooms (e.g., a personal office, a cubicle, etc.) In such an office environment, a likelihood that a person is to move to a given point during a current epoch may depend, at least in part, on whether a given point is located within a hallway, a common room, or a private room/office. For example, users may generally be more likely to be traveling in a hallway than in a common room or more likely to be traveling in a common room than in a private room. Consequently, there may be a greater likelihood that a mobile device starting at a particular point of a grid of points is moving to a first point that is within a hallway than is moving to a second point that is within a private room.

Therefore, as illustrated and described in relation to FIG. 1, a location estimate of a system (e.g., one that is included within a device, such as a mobile device) may be determined based on orientation (determined, for example, via a module/unit/system such as the orientation filter 130 of FIG. 1) and distance traveled (determined, for example, using a pedometer or odometer). The location estimate may be derived using a probabilistic model(s) in which orientation (or orientation change) and distance-traveled values are provided as input to the model(s). The orientation used for the location estimate may be determined based on image data (e.g., by determining vanishing point in an image captured by the system's image capturing unit) and sensor data (e.g., data determined from one or more measurements performed by an accelerometer of the system). Other procedures/systems to estimate a system's location (i.e., other than through a system such as the particle filter 150 of FIG. 1 may also be used.

Figure 2:
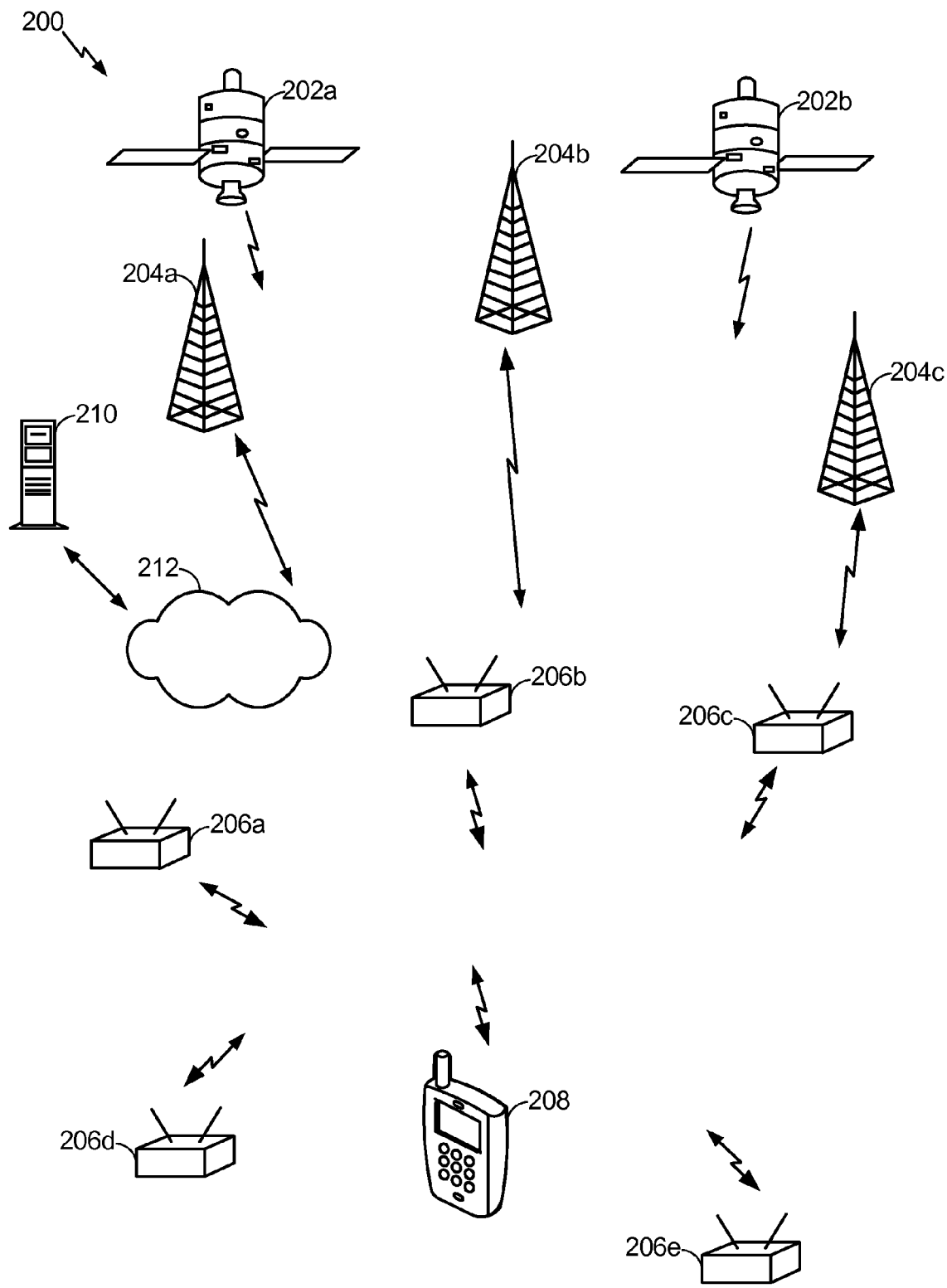
FIG. 2 is a schematic diagram of an example operating environment for a mobile device.

With reference now to FIG. 2, a schematic diagram of an example operating environment 200 for a mobile device 208 is shown. The mobile device 208 (also referred to as a wireless device or as a mobile station) may be similarly configured to, or implemented to similarly operate as, the system 100 depicted in FIG. 1. The mobile device 208 may be configured to operate and interact with multiple types of other communication systems/devices, including local area network devices (or nodes), such as WLAN for indoor communication, femtocells, Bluetooth-based transceivers, other types of indoor communication network nodes, wide area wireless network nodes, satellite communication systems, etc., and as such the mobile device 208 may include one or more interfaces to communicate with the various types of communications systems. As used herein, communication systems/devices with which the mobile device 208 may communicate are also referred to as access points (AP's). As noted, the mobile device is also configured to determine its orientation (e.g., relative to the landscape/area in which it traveling) based, at least in part, on computation of a vanishing point (e.g., a single vanishing point) in a 2D captured image of a scene, and based on a measurement (e.g., a single measurement of an accelerometer). In some embodiments, the determined orientation (or heading) of the device, in conjunction with distance traveled (as determined by a pedometer) may be used to, for example, determine an estimated location of the device 208. For example, as noted, when the device is located in an indoor environment, and general location determination procedure or systems (e.g., based on signals from various transmitters) may be not be available, the device may still be able to determine its estimated location based on the distance and orientation (heading) measured or determined from its onboard sensors and units, without having to rely on communication of signals from remote devices/systems.

The operating environment 200 may contain one or more different types of wireless communication systems or nodes. Such nodes, also referred to as wireless access points (or WAPs) may include LAN and/or WAN wireless transceivers, including, for example, WiFi base stations, femto cell transceivers, Bluetooth transceivers, cellular base stations, WiMax transceivers, etc. Thus, for example, and with continued reference to FIG. 2, the operating environment 200 may include Local Area Network Wireless Access Points (LAN-WAPs) 206a-e that may be used for wireless voice and/or data communication with the mobile device 208. The LAN-WAPs 206a-e may also be utilized, in some embodiments, as independents sources of position data, e.g., through implementation of trilateration-based procedures based, for example, on time of arrival techniques. The LAN-WAPs 206a-e can be part of a Wireless Local Area Network (WLAN), which may operate in buildings and perform communications over smaller geographic regions than a WWAN. Additionally in some embodiments, the LAN-WAPs 206a-e could also include pico or femto cells that are part of a WWAN network. In some embodiments, the LAN-WAPs 206a-e may be part of, for example, WiFi networks (802.11x), cellular piconets and/or femtocells, Bluetooth Networks, etc. The LAN-WAPs 206a-e can also form part of an indoor positioning system. Although five (5) LAN-WAP access points are depicted in FIG. 2, any number of such LAN-WAP's may be used, and, in some embodiments, the operating environment 200 may include no LAN-WAPs access points at all, or may include a single LAN-WAP access point. Furthermore, each of the LAN-WAPs 206a-e depicted in FIG. 2 may be a moveable node, or may be otherwise capable of being relocated.

As further shown in FIG. 2, the operating environment 200 may also include, in some embodiments, a plurality of one or more types Wide Area Network Wireless Access Points (WAN-WAPs) 204a-c, which may be used for wireless voice and/or data communication, and may also serve as another source of independent information through which the mobile device 208 may determine its position/location. The WAN-WAPs 204a-c may be part of wide area wireless network (WWAN), which may include cellular base stations, and/or other wide area wireless systems, such as, for example, WiMAX (e.g., 802.16), femtocell transceivers, etc. A WWAN may include other known network components which are not shown in FIG. 2. Typically, each WAN-WAPs 204a-204c within the WWAN may operate from fixed positions, and provide network coverage over large metropolitan and/or regional areas. Although three (3) WAN-WAPs are depicted in FIG. 2, any number of such WAN-WAPs may be used. In some embodiments, the operating environment 200 may include no WAN-WAPs at all, or may include a single WAN-WAP. Additionally, each of the WAN-WAPs 204a-c depicted in FIG. 2 may be a moveable node, or may otherwise capable of being relocated.

Communication to and from the mobile device 208 (to exchange data, enable position determination of the device 208, etc.) may thus also be implemented, in some embodiments, using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

When deriving position using the WWAN or WLAN, the mobile device 208 may utilize time of arrival techniques, optionally with the assistance of a positioning server 210 and a network 212. Thus, the mobile device 208 may be configured to determine position information using WAN-WAPs 204a-c which may include WAPs of different types (e.g., cellular base stations, WiMax base stations, etc.) In such an operating environment, the mobile device 208 may be able to use the signals from the different types of WAN-WAP to improve accuracy. The positioning server 210 may communicate with the mobile device 208 through the network 212.

In some embodiments, and as further depicted in FIG. 2, the mobile device 208 may also be configured to at least receive information from a Satellite Positioning System (SPS) 202a-b, which may be used as an independent source of position information for the mobile device 208. The mobile device 208 may thus include one or more dedicated SPS receivers specifically designed to receive signals for deriving geo-location information from the SPS satellites. Thus, in some embodiments, the mobile device 208 may communicate with any one or a combination of the SPS satellites 202a-b, the WAN-WAPs 204a-c, and/or the LAN-WAPs 206a-e. In some variations, each of the aforementioned systems can provide an independent information estimate of the position for the mobile device 208 using different techniques. In some embodiments, the mobile device may combine the solutions derived from each of the different types of access points to improve the accuracy of the position data.

In embodiments in which the mobile device 208 can receive satellite signals, the mobile device may utilize a receiver specifically implemented for use with the SPS that extracts position data from a plurality of signals transmitted by SPS satellites 202a-b. Transmitted satellite signals may include, for example, signals marked with a repeating pseudo-random noise (PN) code of a set number of chips and may be located on ground based control stations, user equipment and/or space vehicles. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

As used herein, a mobile device or station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station." In some embodiments, the procedures described herein, including procedures to determine vanishing points, determine a device's orientation, estimate the device's location, calibrate sensors, etc., may be performed by devices that do not have wireless functionality (e.g., functionality to wirelessly communicate with other remote devices).

In accordance with certain aspects, the techniques/procedures presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 3:
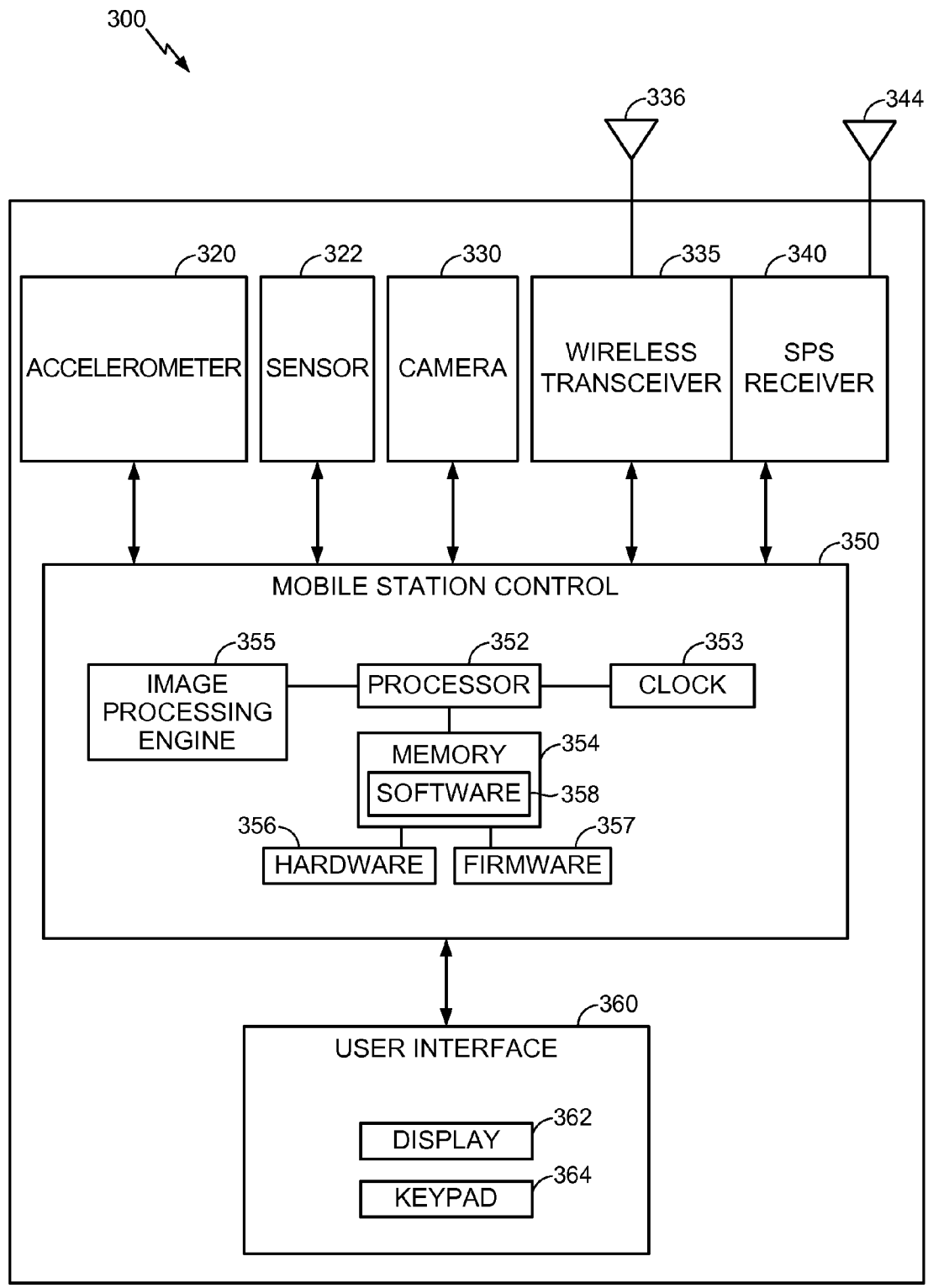
FIG. 3 is a block diagram of a mobile device.

With reference now to FIG. 3, a block diagram of a mobile device 300, which may be similar to the device 208 described in relation to FIG. 2, is shown. As illustrated in FIG. 3, the mobile device 300 includes at least one accelerometer 320 (e.g., a 3D accelerometer), and may also include one or more additional sensors (e.g., spatial or inertial sensor) 322, including, for example a magnetometer, a gyroscopes, etc. The accelerometer 320 may be similar to the accelerometer 120 of the system 100 depicted in FIG. 1, and may thus be a 3-D accelerometer implemented based on MEMS technology, or based on some other technology. The mobile device further includes an image capturing unit/device, such as a camera 330 (e.g., a charge-coupled device (CCD)-type camera, CMOS-type camera, etc.), which may produce still or moving images (e.g., a video sequence) that may be displayed on a user interface device, such as a display or a screen, or that may be processed and/or communicated to other devices/systems.

In some embodiments, the mobile device 300 may include a receiver 340, such as a satellite positioning system (SPS) receiver that receives signals from a SPS satellites (such as the satellites 202a-b of FIG. 2) via an antenna 344. The mobile device 300 also includes a wireless transceiver 335, which may be, e.g., a cellular modem or a wireless network radio receiver/transmitter configured to send and receive communications to and from one or more wireless access points (such as any of LAN-WAPs 206a-e and/or the WAN-WAPs 204a-c), or to and from any other type of network node configured for wireless/cellular communication. Communication to and from the wireless transceiver may be enabled via a dedicated antenna 336, via the antenna 344, or via some other antenna. If desired, the mobile device 300 may include separate transceivers that serve as the cellular modem and the wireless network radio receivers/transmitters.

The accelerometer 320, the camera 330, the SPS receiver 340, and the wireless transceiver 335 are connected to, and communicate with, a mobile device controller 350. The controller 350 is configured to accept and process data at least from the accelerometer 320, the camera 330, the SPS receiver 340, and/or the wireless transceiver 335, and to control the operation of the various on-board units/modules of the device 300, as well as to control the general operation of the mobile device 300. For example, the controller 350 is configured to process images captured by the camera 330, determine a vanishing point in the captured image, determine relative orientation of the device 300 based, at least in part, on the determined vanishing point and at least one measurement from the accelerometer 320. The controller 350 may include, in some implementations, a processor 352 and associated memory 354, a clock 353, hardware 356, software 358, and firmware 357. The mobile station controller 350 may further include, in some embodiments, a dedicated image processing engine 355, which is illustrated separately from processor 352 for clarity, but which may constitute part of the processor 352. The image processing engine 355 is configured to process images to identify, for example, lines of various features in an image captured by the camera 330 so as to identify/determine vanishing points to which the identified lines converge. Based on the determined vanishing points (e.g., a single vanishing point), the relative orientation of the device 300 (e.g., relative to some geographical feature such as a hallway) may be determined, with which, as will be described in greater details below, orientation sensors fitted on the mobile device 300 may be calibrated.

Figure 4:
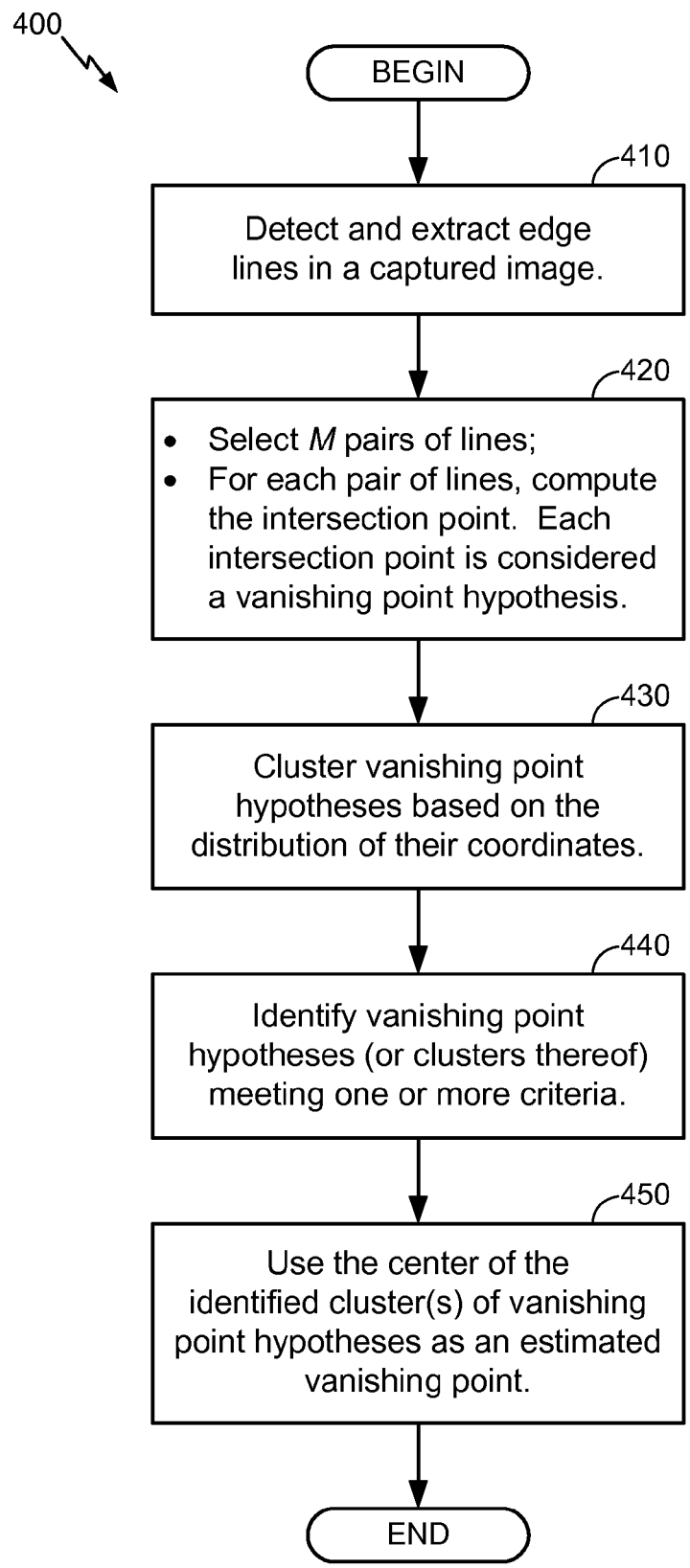
FIG. 4 is a flowchart of an example procedure to determine a vanishing point in an image.
Figure 5:
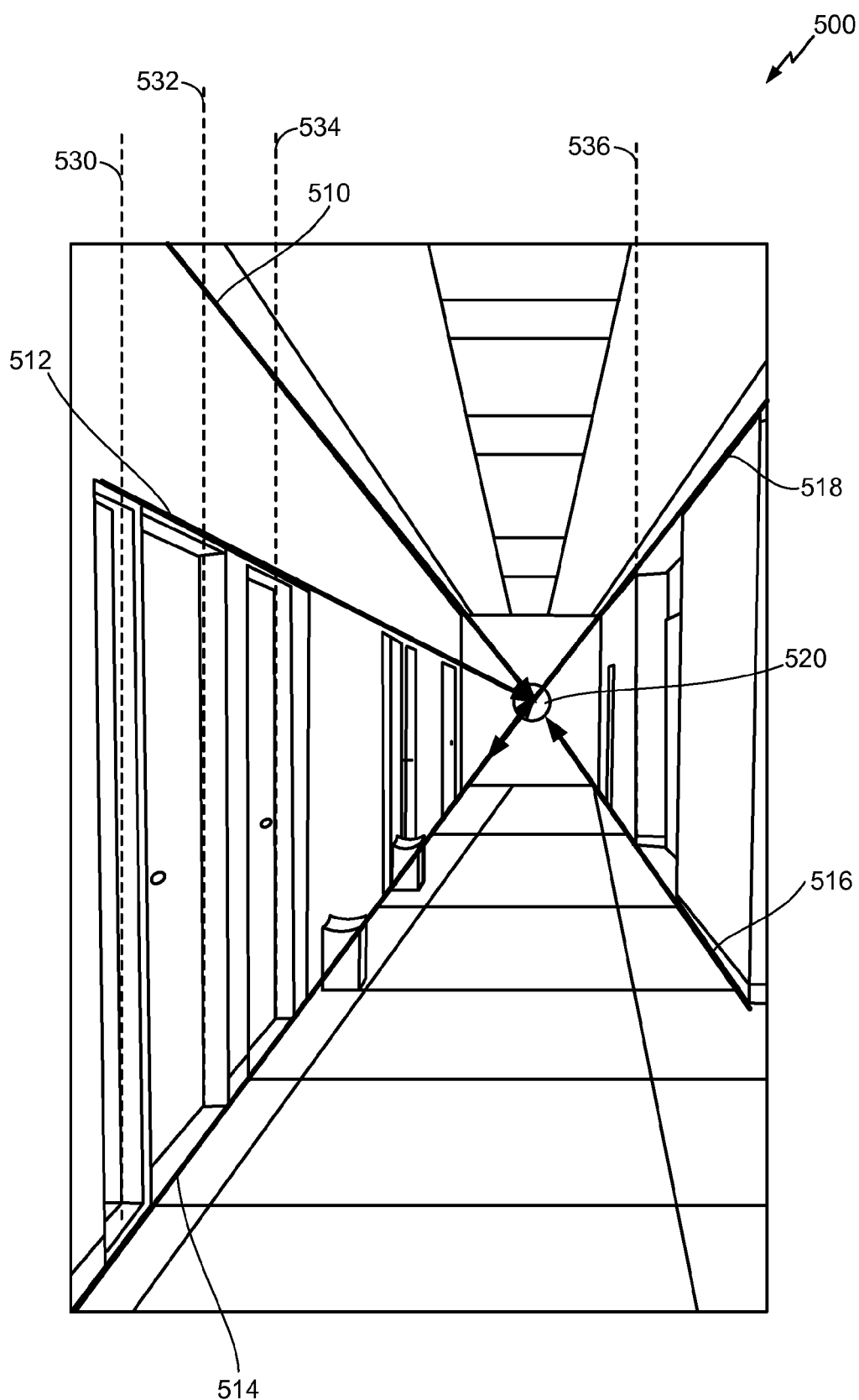
FIG. 5 is a diagram showing convergence of lines to vanishing points in a captured 2-D image of a 3D-scene.

Determining vanishing point(s) in an image captured by, for example, the camera 330 of FIG. 3, may be performed based on a procedure such as the one depicted in FIG. 4. An example vanishing point determination procedure 400 illustrated in the flowchart of FIG. 4 includes detecting and extracting 410 edge lines in the image captured, for example, by the camera 330 of the mobile device 300. In some implementations, detecting and extracting edge lines may be performed by applying an edge or line detector operators such as, for example, a convolution kernel (such as Sobel filtering, Canny, Canny-Deriche, Differential, Prewitt, Roberts Cross, or other appropriate operators) to detect edge pixels, which are then connected and fitted into line segments. Other procedures/technique for identifying lines in an image, including procedures based on line fitting techniques such as a Hough transform, may also be used. Examples of line segments extracted from an image include lines 510-518 and lines 530-536 that were extracted from an image 500 shown in FIG. 5. More particularly, FIG. 5 shows convergence of the lines 510-518 (which are parallel in a 3-D scene) to a common vanishing point 520 in the captured image 500. In the example of FIG. 5, a user, standing in the middle of a hallway, may point its mobile device's camera (which may be similar to the cameras 110 or 330 of FIGS. 1 and 3, respectively) approximately along the longitudinal axis of the hallway. Based on the location of the common vanishing point 520 (and/or the location of on some other vanishing point that may be identified in the captured image 500 of the scene), from which a vector corresponding to that vanishing point may be determined/defined, and based additionally on a gravity vector (defining the downward direction for the device) determined from a measurement performed by an accelerometer of the device (such as the accelerometer 120 or 320 of FIGS. 1 and 3, respectively), the device's rotation matrix, establishing the relationship between the real-world coordinates and the camera coordinate system (which is representative of the device's relative orientation) is determined.

Continuing with FIG. 4, having determined edge lines present in the captured image, a set number M of pairs of lines (where M may be a predetermined number that can be adjusted based on a degree of precision desired for determining vanishing points) is selected 420, and an intersection point for each such pair of lines is determined/computed (also at 420). The intersection point of each of the selected M pair of lines may represent a vanishing point hypothesis. The determined hypotheses of vanishing points are clustered 430 based, for example, on the distribution of the vanishing points' coordinates. In some embodiments (e.g., embodiments in which one vanishing point may be extracted to determine a device's relative orientation), the one or more vanishing points hypotheses that meet one or more criteria are identified 440, and a point that is at (or is approximately at) the center of the identified cluster is deemed/estimated 450 to be the vanishing point of the captured image. The one or more criteria that may be applied to identify vanishing points may include such criteria as the number of points in a cluster of vanishing points (e.g., for a cluster having the largest number of points, one of its points, for example the most central point, can be chosen as the identified vanishing point), the proximity of clusters of vanishing point hypotheses to a certain location, e.g., the center of the image), etc. Other procedures/techniques for identifying vanishing points may also be used. In some embodiments, two or more vanishing points may be selected, one of which may include a vanishing point closest to the center of the image.

Turning back to FIG. 3, the processor 352 may, but need not necessarily include, one or more microprocessors, embedded processors, controllers, application specific integrated circuits (ASICs), digital signal processors (DSPs), and the like. As used herein the term "memory" refers to any type of non-transitory computer storage medium, including long term, short term, or other memory associated with the mobile station, and is not to be limited to any particular type of memory or number of memories, or type of media upon which memory is stored. Further details regarding an example embodiment of a processor or computation system, which may be similar to the processor 352, are provided below in relation to FIG. 10.

The mobile device 300 also includes a user interface 360 that is in communication with the controller 350, e.g., the controller 350 may accept data from, send data to, and control the user interface 360. The user interface 360 includes a display 362 that may display images, including images produced by the camera 330. The display 362 may further display control menus and positional information. The user interface 360 further includes input interface devices, such as, for example, a keypad 364, a touch screen (not shown), a microphone and speaker (not shown), or other input device through which the user can input information into the mobile device 300.

Figure 6:
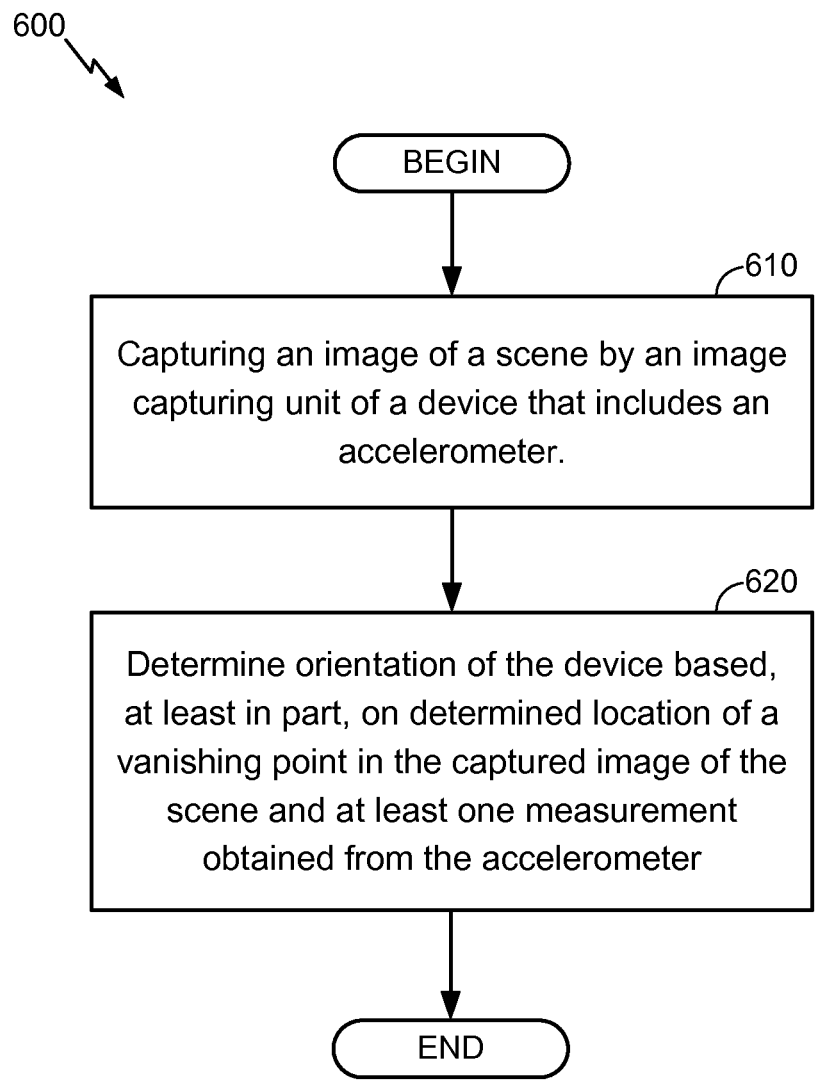
FIG. 6 is a flowchart of an example procedure to determine orientation of a device.
Figure 7A:
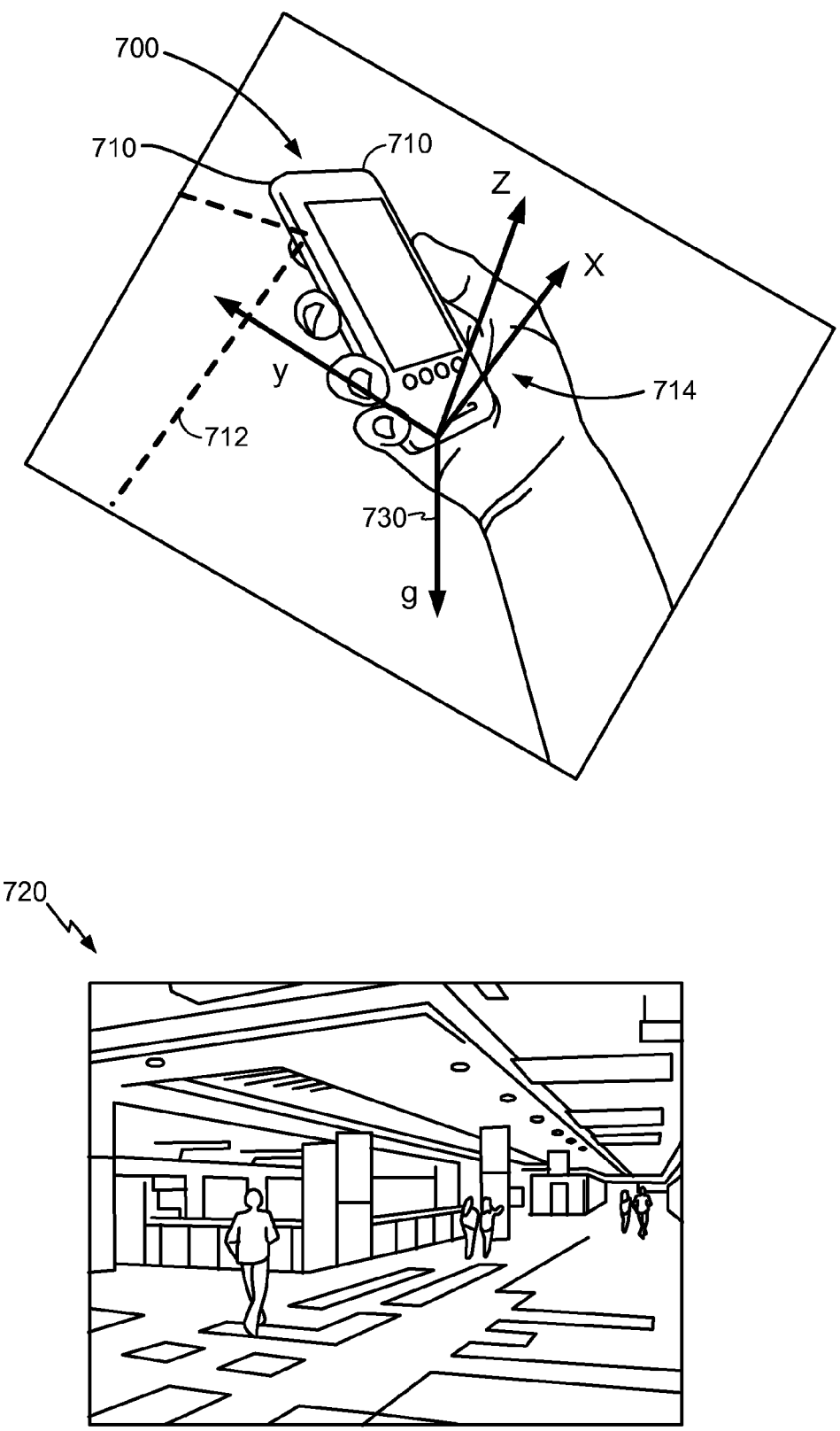
FIG. 7A is a diagram of a handheld mobile device that includes an image capturing unit, and an example image obtained by the image capturing unit of the device.

As noted, through determination of one vanishing point in an image captured by an image capturing unit of a device (in some embodiments, location of only a single vanishing point may be required, although locations of additional vanishing point in a captured image may optionally be determined), and determination of a gravity vector representative of the downward direction of the device, the device's orientation is determined. Thus, with reference to FIG. 6, a flowchart of an example procedure 600 to determine orientation of a device (e.g., a mobile device such as the device 300 of FIG. 3) is shown. The procedure 600 includes capturing 610 an image of a scene by an image capturing unit (e.g., exposing photosensitive elements of the image capturing unit to the scene, and processing the resultant signals generated by the photosensitive elements) of a device that includes an accelerometer. FIG. 7A shows an example handheld mobile device 700 that includes an image capturing unit 710 with an associated field of view 712. An example image 720 taken by the camera of the scene viewable through the camera 710 is provided. For the purpose of illustration, an example frame of reference 714 corresponding to the camera 710 of the device 700 is also shown in the FIG. 7A. The device 700 also include an accelerometer (not shown in FIG. 7A) that provides measurements from which a gravity vector, representative of the downward direction for the device 700, may be determined A gravity vector 730, computed for the device 700, is shown.

In some embodiments, the image capturing unit 710 of the mobile device 700 may include a movable camera housing that allows a lens of the image capturing unit 710 to point to the side. In such embodiments, the device 700 may be configured to, e.g., via a location engine implementation similar to the particle filter 150 of FIG. 1, move the lens position. Movement of the lens position may be required in response to a determination that no vanishing point was detected in a currently captured image, thus resulting in a suggestion being made to the user (e.g., via a user-interface) to move the device and/or move the camera's lens on that device, e.g., move the device from side to side (for example, from left to right). Alternatively, in response to a determination that no vanishing point has been detected in a currently captured image, a controller of the mobile device 700 may automatically cause actuation of a displacement mechanism controlling displacement of camera's lens to thus cause the camera's lens to move to enable capturing of another image in which a vanishing point may be detected. In some embodiments, the camera's lens may enable vision based navigation. For example, if the detected vanishing point is identified as a vertical one (which generally is not suitable for determining the device's orientation), by rotating the camera to the side or by changing the location of the lens and the focus, a different set of parallel lines may be detected whose vanishing point corresponds to a non-vertical vector, thus enabling estimation of the orientation of the device. In these cases an internal mechanism, such as servo motors equipped with encoders, keep track of the relative rotation of the camera or the movement of the lens compared to the default position. The readings from these encoders can be added to the focal length value, f, in the intrinsic calibration matrix (e.g., in case of translation of the lens), or to compute the orientation of the detected vanishing point with respect to the device's frame of reference (e.g., in case of rotation of the lens and housing).

Capturing an image of a scene (such as the example image 720) may be performed at the discretion of the user carrying the device who may activate the camera, or it may be initiated automatically in response to a determination that some pre-determined interval of time has elapsed. For example, in embodiments in which estimated location of a traveling device is determined based on orientation (e.g., heading) and distance traveled computations, periodic determination of the distance traveled and the present orientation of the device may be performed automatically at such pre-determined intervals. An automatic determination of, for example, the present orientation may include sending instructions/directions to the user where the user's help is required to determine the device's orientation (e.g., requesting the user to raise the camera and activate it to have an exposure of the scene). In some embodiments, a screen display (such as the display 362 of the device 300 of FIG. 3) may present an image taken with the device's camera (such a camera may be positioned at the side of the device opposite where the display is located) to enable the user to point the camera at particular features, e.g., features, such as hallways, that are associated with identifiable vanishing points. Once the image of the scene is taken, a vanishing point in the image may be, in some embodiments, marked/identified in the captured image displayed on the device's display (e.g., superimposing features like a star or a dot at location on the displayed image corresponding to determined vanishing points in that image). For example, FIG. 7B include the image 720 (taken by the image capturing unit 710), in which example vanishing points 722 and 724, and the line segments converging thereto (namely, lines 723a-e for the vanishing point 722, and lines 725a-c for the vanishing point 724), are illustrated.

In some embodiments, the camera can be periodically sampled to see if some threshold number of lines can be detected in the captured image. If enough lines are detected, further vanishing point computations (e.g., according to a procedure such as the procedure 400 of FIG. 4) may be performed. If, however, it is determined that there are insufficient lines to identify/determine a vanishing point in the scene, the camera may automatically capture a new image of the scene, or the user may be prompted to take a new image (e.g., position the camera in a direction where there is a higher likelihood of identifying sufficient number of lines in the captured image from each at least one vanishing point can be determined). In some implementations, an on-screen camera sign or other indication (e.g., an audio indication such a buzz, or a tactile indication such vibration of the device) may be provided to the user to guide the user to hold the phone in a better position so that sufficient number of lines can be detected in the image and used for orientation determination. Subsequently, another indicator (e.g., another buzz or on-screen camera sign) may be provided to show that sufficient number of lines have been detected to enable orientation determination.

In some embodiments, camera sampling (to determine if there are sufficient lines in a new captured image) may be triggered based on a determination that a sensor, such as a gyroscope, measured a rotational change exceeding some pre-determined threshold that warrants capturing a new image to determine the change of orientation based on the new image, e.g., to enable location estimation of the device following the likely change in the orientation of the device as detected by the gyroscope.

In some embodiments, the display of the device may also present a map of the area in which the user is located. For example, a map of the area in which the user is located may occupy a majority of the display surface, while the image captured by the camera may be presented on the remaining area of the display surface (e.g., in a small rectangular area at one corner of the display surface). Alternatively, the image captured by the camera may be presented on a majority of the surface of the display, with the map of the area in which the user is located occupying a smaller portion of the display surface (e.g., at one of the corners of the display surface). In some embodiments, the mobile device may include multiple cameras (e.g., a camera at the back of the device, another camera located on one of its sides, etc.) to thus concomitantly take multiple images of the scene from which multiple vanishing points can be determined (if necessary).

Turning back to FIG. 6, as shown, orientation of the device is determined 620 based, at least in part, on determined location of a vanishing point in the captured image of the scene and at least one measurement obtained from the accelerometer. As noted, in some implementations a vanishing point determination procedure, such as the procedure 400 of FIG. 4, may be used to compute a vanishing point in the captured image of the scene, and a vanishing point vector is computed therefrom. Thus, for example, in such implementations, edge lines in the captured image are detected, clusters of intersection points of multiple pairs of lines are determined, and one or more clusters from those clusters of intersection points is selected (e.g., based on one or more criteria, such as the number of intersection points in a cluster, the proximity of the cluster to the center of the captured image, etc.) Because, in some implementations, only one vanishing point is needed to be identified, it may be sufficient to only identify a single cluster of points. Additionally, at least one measurement from the device accelerometer's (which may be similar to the accelerometer 110 or 320 of FIGS. 1 and 3, respectively) is obtained, and a gravity vector, indicative of the downward direction for the device, is determined based on the at least one measurement of the accelerometer. For example, in situations where an image is taken when the mobile device is stationary, both the direction and the strength of the gravitational field may be inferred (e.g., the gravity field will be equal to and opposite to the accelerometer's reading).

Figure 7B:
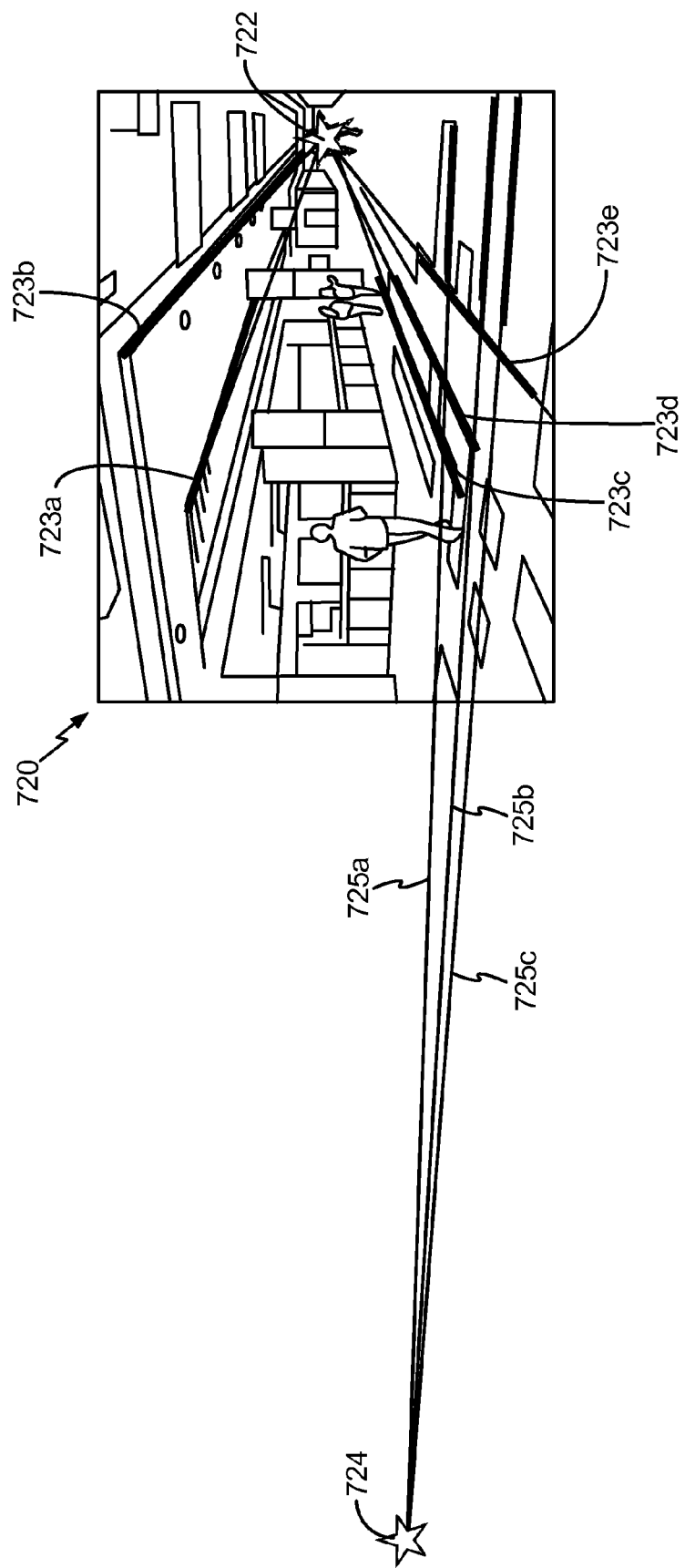
FIG. 7B is the example image of FIG. 7A in which example vanishing points and the line segments converging to them are illustrated.

Based on a vanishing point vector (e.g., a vanishing point vector determined from either the vanishing points 722 or 724 illustrated in FIG. 7B) and a gravity vector (e.g., a gravity vector such as the vector 730 determined for the device 700 of FIG. 7A), orientation of the camera (such as the camera 710 of the device 700 of FIG. 7a) that captured the image of the scene, and thus the orientation of the mobile device, is determined and may be represented as a rotation matrix. In some implementations, when two directional vectors are identified for the camera, a third directional vector may be estimated based, for example, on computing a directional vector that is orthogonal to the two directional vectors determined from image and accelerometer data, e.g., by performing a cross-product operations on the two directional vectors. Based on the three directional vectors (i.e., the two determined from the captured image and the accelerometer measurement, and the third determined, for example, as the cross-product of the first two vectors), a rotation matrix is determined from which a rotation angle between the camera's image plane to the world coordinate system can be derived (and thus enable determination of the orientation of the device relative to the scene).

More particularly, the following example procedure illustrates the determination of a rotation matrix, R, for a calibrated pin-hole camera. In the calibrated camera of the mobile device, the focal length and principal points of the camera are at least approximately known, and the intrinsic calibration matrix of the camera may be represented as:

$$K = \begin{bmatrix} f & 0 & x_0 \\ 0 & f & y_0 \\ 0 & 0 & 1 \end{bmatrix}$$

Figure 8A:
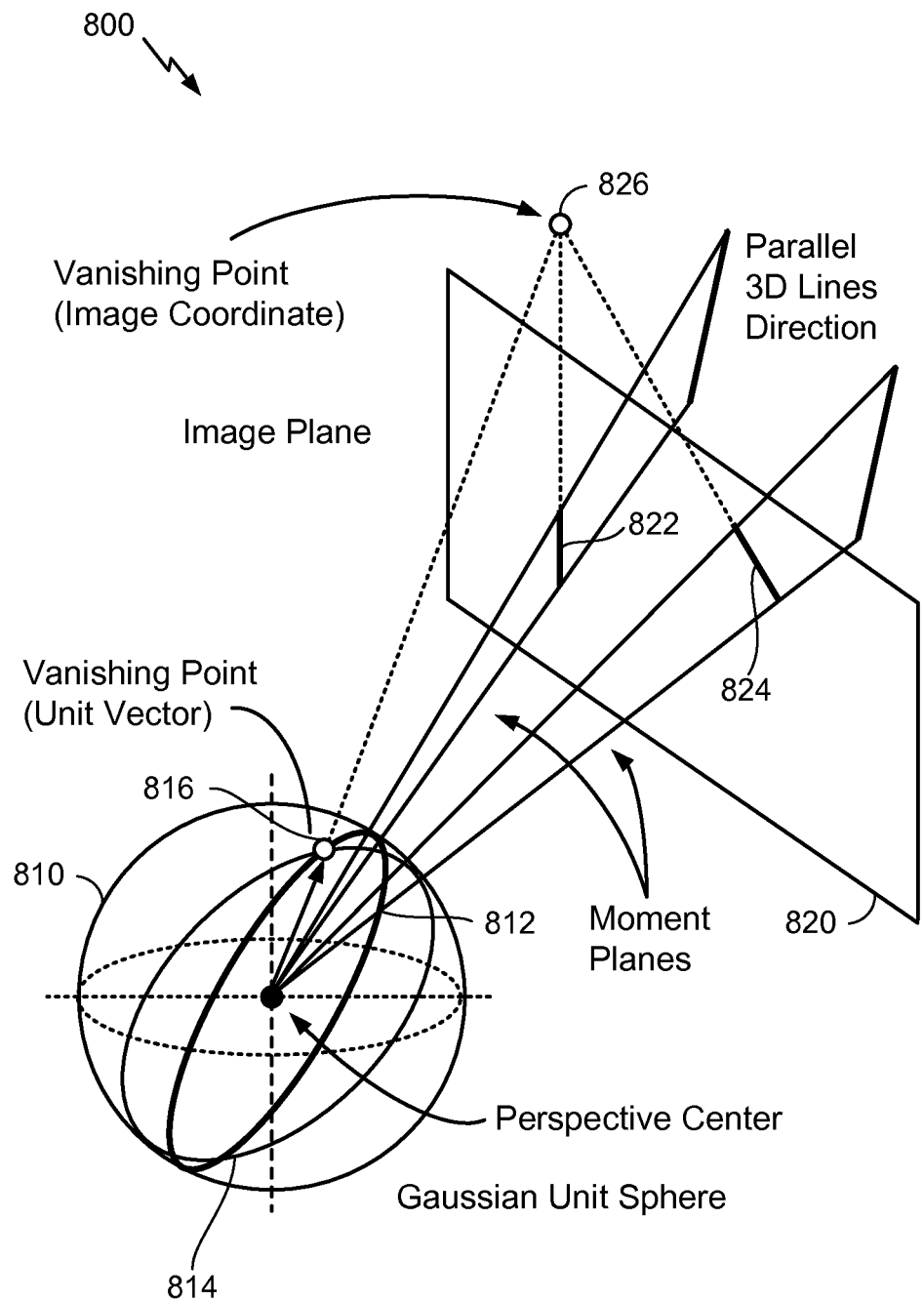
FIG. 8A is a diagram illustrating an example relationship between a unit sphere and lines lying an image plane.

When a camera is intrinsically calibrated, line segments in an image captured by the camera may be represented as so-called "Great Circles" that lie on a unit-radius sphere around the camera's perspective center (i.e., line segments appearing in a captured image define great circles as the intersection of the unit sphere with planes passing through the line segments and the perspective center). For example, with reference to FIG. 8A, showing a diagram of the relationship between a unit sphere 810 and an image plane 820, a line segment 822 is associated with a great circle 812, and a line segment 824 is associated with a great circle 814. As further shown in FIG. 8A, the lines 822 and 824 intersect at a point 826. This vanishing point corresponds to a unit vector 816 on the sphere 810 (the point 816 also corresponds to the intersection if the two great circles 812 and 814). This unit sphere is commonly referred to as a "Gaussian Sphere." The great circles can be detected by intersecting the Gaussian sphere with the (moment) plane that passes through the line segment and the camera's perspective center.

In situation where line segments extracted from an image are not parallel (e.g., the lines 510-518 of FIG. 5), the line segments intersect each other on the image plane. The (homogeneous) coordinate of this intersection can be represented as $p = [u \ v \ 1]^T$ where u and v are the finite coordinates of the vanishing point on the image plane. The unit length vector of that vanishing point can be determined according to:

$$\bar{p} = \frac{p}{\|p\|}$$

Figure 8B:
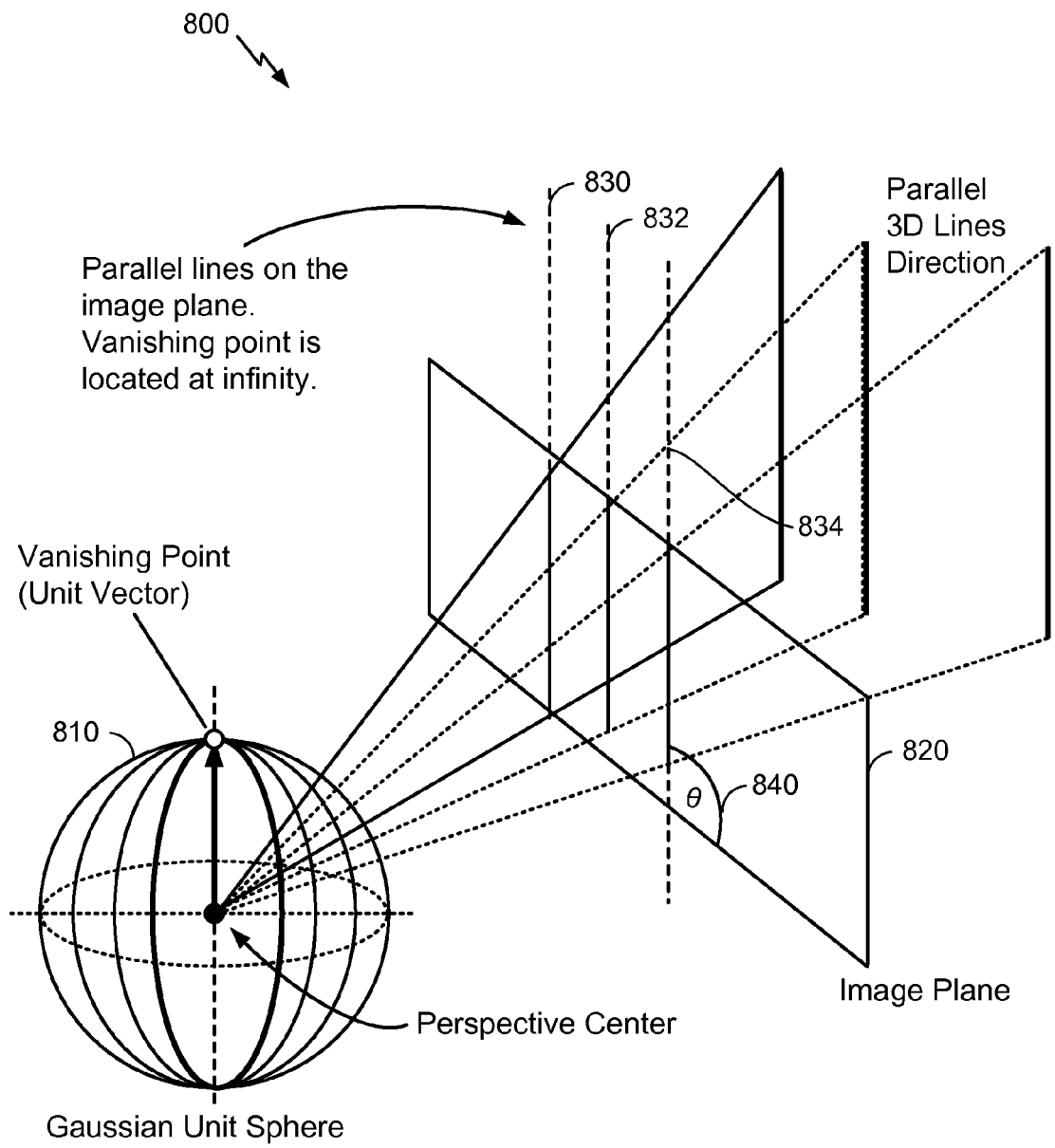
FIG. 8B is a diagram illustrating another example relationship between a unit sphere and lines lying in an image plane.

In situations where 3D parallel lines appear in the 2D image plane as parallel lines (as is the case with lines 830, 832, and 834 depicted in FIG. 8B, or with any of the lines 530, 532, 534, and 536 appearing in the example of FIG. 5), those parallel line segments will not intersect each other on the image plane. In this case the vanishing point is considered to be at infinity. However, the vanishing point on the Gaussian sphere corresponding to image plane vanishing points that are at infinity can be obtained at the intersection of great circles corresponding to those parallel line segments. In that case, the unit vector determined from the intersection of the great circles corresponding to the parallel lines in the image plane extends in a direction that is parallel to direction of the parallel line segments in the image plane. Based on this observation, the unit-norm vector for the vanishing point obtained at the intersection of the great circles corresponding to the parallel 2D line segments (whose corresponding vanishing point is at infinity) can be computed as:

$$\bar{p} = \begin{bmatrix} \cos\theta \\ \sin\theta \\ 0 \end{bmatrix}$$

where θ is an angle 840 between the horizontal axis on the image plane 820) and the line 834.

As noted, because the gravity vector, g, associated with the device has been determined (using at least one measurement from the device's accelerometer), it is sufficient, for the purpose of determining the rotation matrix (and thus the device's orientation) to use a single vanishing point from the image (e.g., either the vanishing point marked with a green star, above, or the one marked with a red star). The vector v for that selected vanishing point is then normalized, based on the device's camera's known intrinsic calibration matrix, according to:

$$v_n = K^{-1} v$$

Having normalized the determined vanishing point vector, an axis (e.g., x-axis) of the frame of reference of the closed structure in which the image was taken (e.g., indoor area of a building, such as that shown in the image 720 illustrated in FIGS. 7A and 7B) is aligned with the normalized vanishing point. The orientation of the camera (and thus of the device) with respect to the frame of reference of the closed structure can be derived according to the relationship:

$$R = [v_n g \times v_n g]$$

The resultant matrix R is a rotation matrix that transforms world (global) coordinates of the closed structure frame of reference to the camera's (and therefore the device's) local frame of reference. The rotation matrix R thus represents the relative orientation being sought.

In the above relationship, if it is determined that the cross-product of g and $v_n$ (i.e., $g \times v_n$) is approximately 0, then it may be inferred that $v_n$ is a vector in the vertical direction (and therefore is substantially parallel to the gravity vector). Under those circumstances, a vector corresponding to another vanishing point in the image (if another such vanishing point is available) may need to be used. Alternatively (e.g., if another vanishing point is not available), a new image may need to be taken, and another vanishing point from that new image is determined. Under such circumstances, the user holding the mobile device may be provided with feedback/prompts to direct the user to take a new image.

If the above matrix R is not orthonormal due to inaccuracies of vanishing point detection, an orthonormal matrix can be obtained using QR decomposition. Thus, in some implementations, QR decomposition may be performed on the rotation matrix R to obtain a resultant orthonormal rotation matrix $R_{orthonormal}$. In some embodiments, the frame assignment ambiguity may occur because it may not be known if the detected vanishing point corresponds to x direction, y direction, or z direction. This ambiguity results in several distinct solutions. The correct solution among these can be chosen if there is a rough estimate of the orientation (e.g. from another onboard sensor, such as a magnetometer). Optionally, in some embodiments, when there are sufficient CPU cycles available, an iterative minimization procedure may be performed to take into account the uncertainty of measurements and obtain more accurate estimates of the orientation.

The resultant rotation matrix R represents the relative orientation of the mobile device's camera (i.e., at the particular instance at which the image of the scene was taken). Other ways to compute the orientation of the image capturing unit (and thus the orientation of the mobile device) from the determined location of a vanishing point in a captured image and an accelerometer's measurement may also be used.

Accordingly, in some embodiments, based on a single vanishing point from one image and one accelerometer measurements, rotation matrix for a device can be determined that provides an estimate of the orientation of the image capturing unit (and thus of the device in which the image capturing unit is included) with three (3) degrees of freedom, or a subset thereof, corresponding to roll, pitch, and yaw of the camera. Thus, in some embodiments, one or more of, for example, roll, pitch, and/or yaw may be determined from the rotation matrix. For example, assume that a rotation matrix, R, is a 3×3 matrix with the following entries:

$$\begin{bmatrix} r_{11} & r_{12} & r_{13} \\ r_{21} & r_{22} & r_{23} \\ r_{31} & r_{32} & r_{33} \end{bmatrix}$$

The roll, pitch and yaw angles (namely, γ, β, and α, respectively) can be determined from the rotation matrix, R, based, in some embodiments, on the following relationships:

$$\beta = A\tan2\left(-r_{31}, \sqrt{r_{11}^2 + r_{21}^2}\right)$$

$$\alpha = A\tan2\left(\frac{r_{21}}{\cos\beta}, \frac{r_{11}}{\cos\beta}\right), \text{ and}$$

$$\gamma = A\tan2\left(\frac{r_{32}}{\cos\beta}, \frac{r_{33}}{\cos\beta}\right)$$

where Atan2 is an extended "arc tangent" function with two arguments, that computes the correct quadrant based on the signs of the input arguments.

Figure 9:
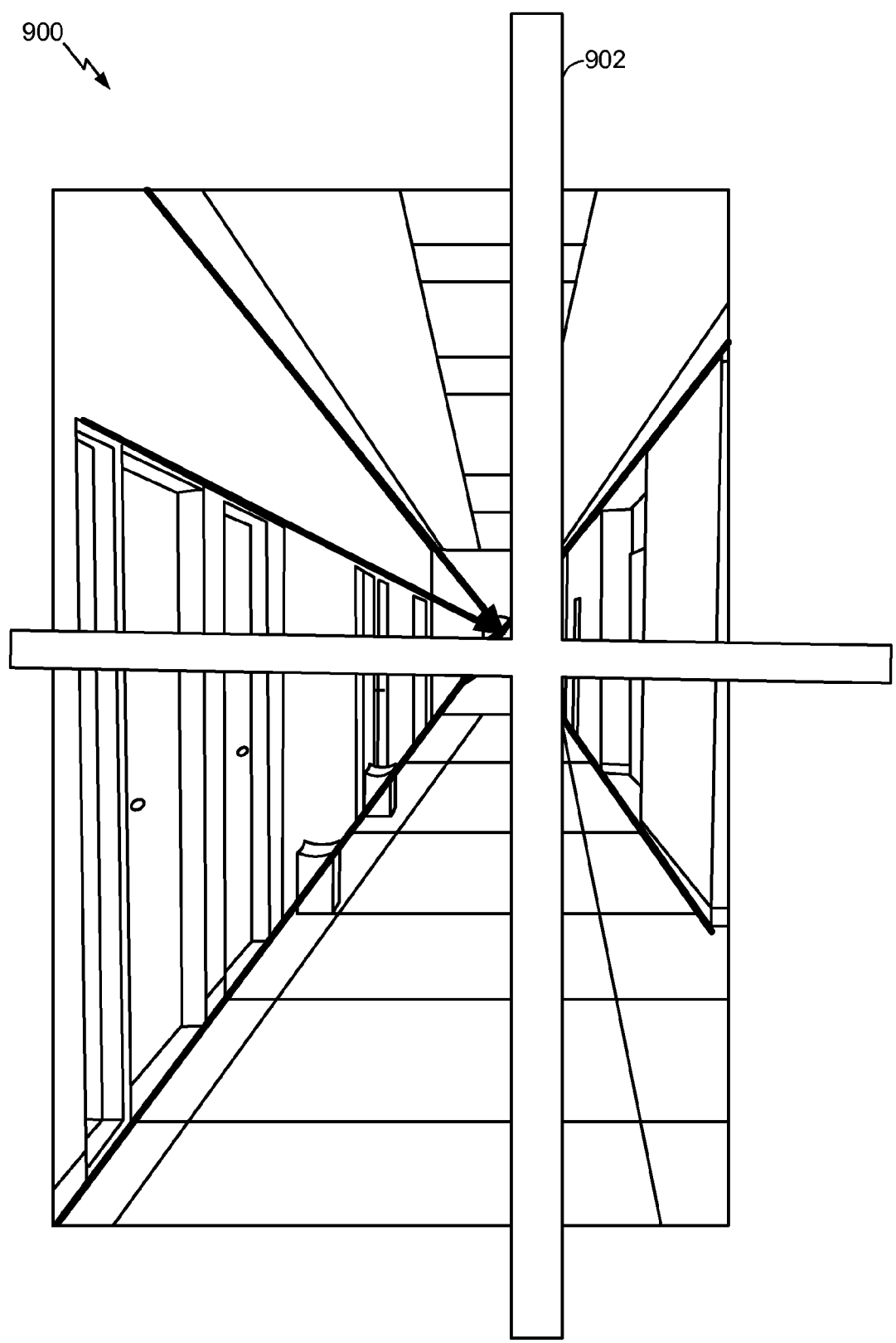
FIG. 9 is an image in which an example of a cross-hair guide is presented to enable the user to align the mobile device it is holding.

In some embodiments, to further improve accuracy of the determination of the vanishing point (e.g., to enable placing of the captured image's vanishing point substantially at the center of the image), a guide, such as the cross-hair, may be displayed (e.g., superimposed) on the image captured by the image capturing unit to indicate the current location of the computed vanishing point in the captured image. A substantially symmetrical cross-hair display on the image of the captured scene may indicate that the computed vanishing point is substantially at the center of the image. An example of a cross-hair guide 902 appearing in an image 900 of a hallway that may be used to enable the user to align the mobile device it is holding is shown in FIG. 9.

Having determined the orientation of a device (such as the devices 100, 208, 300, or 700), procedures and operations that use the determined device orientation may be performed. For example, as described herein, in some implementations, the determined device orientation may be used to estimate location of a device, e.g., in embodiments where data and signals from remote devices, such as remote access points, satellites, etc., to enable determination of the device's location, may not be readily available. An example of such a location estimation procedure was described in relation to the particle filter 150 depicted in FIG. 1. In implementations of such a location estimation procedure, the particle filter may have determined an initial starting location based on signals received from other devices (e.g., via a WiFi transceivers, or transceivers to enable other modes of communications from remote device) by performing location determination procedures such as multilateration techniques (e.g., determining RSSI or RTT parameters associated with received signals from one or more access points, and based on the known location of the access points determining the position of the mobile device), signal profile identification techniques (comparing determined parameter values of, for example, RSSI and/or RTT, to stored profiles that are associated with pre-determined positions), etc. Subsequent locations for the device may be determined as estimates (e.g., aided by probabilistic models) based on the distance and direction (determined from the device's orientation) traveled by the device since its starting location was determined.

In some embodiments, the determined orientation may also be used to facilitate calibration of one or more sensors of the mobile device (e.g., sensors in addition to the device's accelerometer and/or its image capturing unit). For example, the device's determined orientation may be used to perform calibration of a gyroscope sensor such as one implemented based on MEMS technology, or some other technology. Such a sensor may be a single-axis gyroscope, a double-axis gyroscope, or a 3-D gyroscope configured to sense motion about, for example, three orthogonal axes. Calibration of a gyroscope may be performed, for example, by comparing the gyroscope-measured orientation with the orientation (determined from a vanishing point and a gravity vector) to compute the bias, scaling, and/or misalignment of the gyroscope. To calibrate a gyroscope sensor it may be sufficient to calculate the change in orientation, i.e., the orientation delta (orientation Δ). Thus, in some embodiments, calibration of a gyroscope may include determining the change in measured orientation by a gyroscope, and comparing that measured change to the change in orientation as determined from the vanishing point and gravity vector approach (i.e., comparing the delta angle detected by both approaches). The change of relative orientation as determined using the device's computed vanishing point vectors and gravity vectors can thus enable computation of sensor calibration coefficients and/or correction of some of the gyroscope settings/parameters, e.g., the sensor's scaling factor, the sensor's bias, etc., so that the gyroscope would measure a change of orientation that is consistent (e.g., is substantially the same) as the orientation determined from vanishing point and gravity vectors computations. In some embodiments, determination of the bias error and/or scaling-error associated with the gyroscope may be achieved by causing the mobile device to undergo a rotational change, measuring the change in orientation from a plurality of images captured during the rotational change of the gyroscope, and determining from the rotational change (determined from gravity and vanishing point vector computations for each of the captured images), and from the output produced by the gyroscope, the offset and scaling values associated with the gyroscope, e.g., by solving for several unknowns, such as the bias error and scaling error, based on multiple measurements using such procedures as linear regression, etc.

In another example, a mobile device's determined orientation may be used to perform calibration of, for example, a magnetometer. Magnetometers are configured to measures a magnetic field intensity and/or direction, and may, in some embodiments, measure absolute orientation with respect to the magnetic north, which can be converted to orientation with respect to true north. In some implementations, MEMS-based magnetometer may be used. Such MEMS-base sensors may be configured to detect motion caused by the Lorentz force produced by a current through a MEMS conductor. The resultant motion may then be sensed electronically or optically. Other types of magnetometers, including such magnetometer as, for example, hall effect magnetometers, rotating coil magnetometers, etc., may also be used in implementations of the mobile device in place of, or in addition to, the MEMS-based implementations, Calibration of a magnetometer-type sensor may be performed in a manner similar to the calibration of a gyroscope-type sensor by, for example, comparing the magnetometer-measured orientation with the orientation obtained using the gravity and vanishing point vectors approach to compute the bias, scaling, and/or misalignment of the magnetometer to be calibrated. In some embodiments, the calibration procedure may include providing an absolute orientation measurement by the magnetometer and determining an absolute device orientation based on determining the relative orientation of the device from a vanishing point and a measurement obtained from the device's accelerometer, and determining the absolute device orientation based on the determined relative orientation of the device in the scene and based on known direction/orientation values associated with the scene (obtained from a database, such as an assistance data database, containing orientation values for various features in a particular area). The difference between the measured orientation of the magnetometer sensor and the device orientation determined from the vanishing point and accelerometer measurement may thus enable computation of such parameters as the magnetometer's bias/offset value, its scaling factor, etc. The calibration procedure may require the use of several orientation measurements and several computed sets of gravity and vanishing point vectors from one or more images to perform the magnetometer calibration (e.g., in circumstances where calibration of the magnetometer requires computation of multiple calibration coefficients, such as coefficients pertaining to the sensor's offset/bias, scaling, misalignment, etc.) As with gyroscope-calibration procedures, in some embodiments, calibration of a magnetometer sensor may be performed based on change in the device's orientation (e.g., orientation Δ) without specifically requiring knowledge of absolute orientation of the device.

Other types of uses, applications, and procedures relying on a device's orientation determined based on computation of a gravity and vanishing point vector (e.g., determined from one or more accelerometer measurements, and a single vanishing point determination in a captured image of a scene) may be also be performed.

Figure 10:
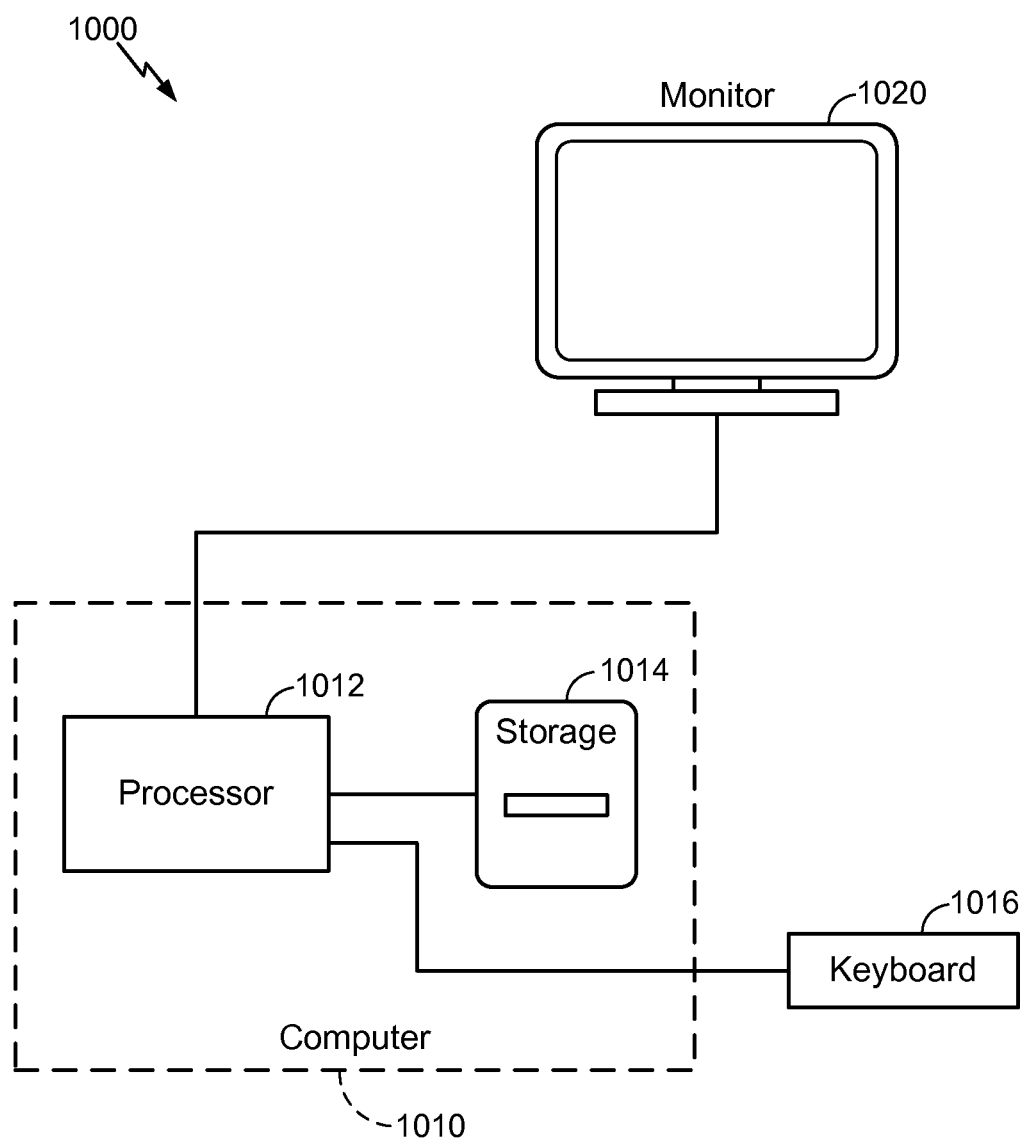
FIG. 10 is a schematic diagram of an example computing system.

Performing orientation determination procedures, location estimation procedures, calibration procedures, etc., as described herein, may be facilitated by a processor-based computing system. With reference to FIG. 10, a schematic diagram of an example computing system 1000 is shown. The computing system 1000 includes a processor-based device 1010 such as a personal computer, a specialized computing device, and so forth, that typically includes a central processor unit 1012. In addition to the CPU 1012, the system includes main memory, cache memory and bus interface circuits (not shown). The processor-based device 1010 may include a mass storage device 1014, such as a hard drive and/or a flash drive associated with the computer system. The computing system 1000 may further include a keyboard, or keypad, 1016, and a monitor 1020, e.g., a CRT (cathode ray tube) or LCD (liquid crystal display) monitor, that may be placed where a user can access them (e.g., a mobile device's screen).

The processor-based device 1010 is configured to facilitate, for example, the implementation of a procedure to determine device orientation based on a vanishing point determined in an image of a scene captured by an image capturing unit of the device and based on a measurement from an accelerometer (included with the device). The processor-based device 1010 is configured to also facilitate implementations of procedures that utilize the determined device orientation, including procedures to estimate location of the device (e.g., via a particle filter that implements a probabilistic-based model of location estimation), sensor calibration, etc. The mass storage device 1014 may include a computer program product that when executed on the processor-based device 1010 causes the processor-based device to perform operations to facilitate the implementation of the above-described procedures. The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), a DSP processor, or an ASIC (application-specific integrated circuit) may be used in the implementation of the computing system 1000. Other modules that may be included with the processor-based device 1010 are speakers, a sound card, a pointing device, e.g., a mouse or a trackball, by which the user can provide input to the computing system 1000. The processor-based device 1010 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the processing-based device or external to the processing-based device. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:
1. A method comprising:
   capturing an image of a scene by an image capturing unit of a device that includes an accelerometer;
   deriving a gravity vector from at least one measurement obtained from the accelerometer;
   determining a location of a vanishing point in the captured image of the scene;
   computing a directional vector based on the determined location of the vanishing point in the captured image of the scene;
   in response to a determination that the computed directional vector is substantially parallel to the gravity vector, re-computing the directional vector based on another location of another vanishing point determined to be present in the captured image of the scene; and
   determining an orientation of the device based, at least in part, on the computed directional vector and the gravity vector derived from the at least one measurement obtained from the accelerometer.

2. The method of claim 1, wherein determining the orientation of the device based on the computed directional vector and the gravity vector comprises:
determining the orientation based, at least in part, on a vector determined from location of a single vanishing point in the captured image and the gravity vector.

3. The method of claim 1, wherein determining the orientation of the device comprises:
determining the orientation of the device relative to a frame of reference of an indoor area in which the device is located.

4. The method of claim 3, further comprising:
normalizing the directional vector corresponding to the determined location of the vanishing point based on an intrinsic calibration matrix of the image capturing unit.

5. The method of claim 4, further comprising:
aligning an axis of the frame of reference of the indoor area to the normalized vanishing point vector; and
determining the orientation of the device based on the aligned axis of the frame of reference of the indoor area.

6. The method of claim 3, wherein determining the orientation of the device comprises:
deriving a rotation matrix to transform location coordinates in the frame of reference of the indoor area to a frame of reference of the image capturing unit of the device.

7. The method of claim 6, further comprising:
determining based on the rotation matrix one or more of: roll of the device, pitch of the device, or yaw of the device.

8. The method of claim 6, further comprising:
performing QR decomposition on the rotation matrix to obtain a resultant orthonormal rotation matrix.

9. The method of claim 1, further comprising:
performing one or more calibration operations for at least one of a gyroscope or a magnetometer of the device based, at least in part, on the device orientation determined based, at least in part, on the computed directional vector and the gravity vector.

10. The method of claim 9, wherein performing the one or more calibration operations for at least one of the gyroscope or the magnetometer comprises one or more of:
comparing gyroscope-measured orientation with the device orientation determined based, at least in part, on the computed directional vector and the gravity vector to obtain gyroscope-comparison results, and computing one or more of gyroscope bias, gyroscope scaling, or gyroscope misalignment based on the gyroscope-comparison results; or
comparing magnetometer-measured orientation with the device orientation determined based, at least in part, on the computed directional vector and the gravity vector to obtain magnetometer-comparison results, and computing one or more of magnetometer bias, magnetometer scaling, or magnetometer misalignment based on the magnetometer-comparison results.

11. The method of claim 1, wherein determining the orientation of the device comprises:
identifying line segments in the captured image of the scene; and
determining the location of the vanishing point in the captured image based on the identified line segments.

12. The method of claim 1, further comprising:
computing the directional vector based on a further vanishing point in a subsequently captured image of the scene when the computed directional vector computed based on the vanishing point in the captured image of the scene is determined to be substantially parallel to the gravity vector, and in response to a determination that an additional vanishing point in the captured image of the scene is not available.

13. A device comprising:
an image capturing unit;
an accelerometer; and
a controller configured to:
determine a location of a vanishing point in an image of a scene captured by the image capturing unit;
obtain at least one measurement performed by the accelerometer;
derive a gravity vector from the at least one measurement obtained from the accelerometer;
compute a directional vector based on the determined location of the vanishing point in the captured image of the scene
re-compute the directional vector based on another location of another vanishing point determined to be present in the captured image of the scene in response to a determination that the computed directional vector is substantially parallel to the gravity vector; and
determine an orientation of the device based, at least in part, on the computed directional vector and the gravity vector derived from the at least one measurement obtained from the accelerometer.

14. The device of claim 13, wherein the controller configured to determine the orientation of the device based on the computed directional vector and the gravity vector is configured to:
determine the orientation based, at least in part, on a vector determined from location of a single vanishing point in the captured image and the gravity vector.

15. The device of claim 13, wherein the controller configured to determine the orientation of the device is configured to:
determine the orientation of the device relative to a frame of reference of an indoor area in which the device is located.

16. The device of claim 15, wherein the controller configured to determine the orientation of the device is configured to:
derive a rotation matrix to transform location coordinates in the frame of reference of the indoor area to a frame of reference of the image capturing unit of the device.

17. The device of claim 16, wherein the controller is further configured to:
determine based on the rotation matrix one or more of: roll of the device, pitch of the device, or yaw of the device.

18. The device of claim 13, wherein the controller is further configured to:
normalize the directional vector corresponding to the determined location of the vanishing point based on an intrinsic calibration matrix of the image capturing unit.

19. The device of claim 13, wherein the controller is further configured to:
perform one or more calibration operations for at least one of a gyroscope or a magnetometer of the device based, at least in part, on the device orientation determined based, at least in part, on the computed directional vector and the gravity vector.

20. The device of claim 13, wherein the controller configured to determine the orientation of the device is configured to:
identify line segments in the captured image of the scene; and determine the location of the vanishing point in the captured image based on the identified line segments.

21. An apparatus comprising:
means for capturing an image of a scene;
means for deriving a gravity vector from at least one measurement obtained from an accelerometer of a device;
means for determining a location of a vanishing point in the captured image of the scene;
means for computing a directional vector based on the determined location of the vanishing point in the captured image of the scene
means for re-computing the directional vector based on another location of another vanishing point determined to be present in the captured image of the scene in response to a determination that the computed directional vector is substantially parallel to the gravity vector; and
means for determining an orientation of the device based, at least in part, on the computed directional vector and the gravity vector derived from the at least one measurement obtained from the accelerometer.

22. The apparatus of claim 21, wherein the means for determining the orientation of the device based on the computed directional vector and the gravity vector comprise:
means for determining the orientation based, at least in part, on a vector determined from location of a single vanishing point in the captured image and the gravity vector.

23. The apparatus of claim 21, wherein the means for determining the orientation of the device comprise:
means for determining the orientation of the device relative to a frame of reference of an indoor area in which the device is located.

24. The apparatus of claim 23, wherein the means for determining the orientation of the device comprise:
means for deriving a rotation matrix to transform location coordinates in the frame of reference of the indoor area to a frame of reference of the means for capturing the image.

25. The apparatus of claim 24, further comprising:
means for determining based on the rotation matrix one or more of: roll of the device, pitch of the device, or yaw of the device.

26. The apparatus of claim 21, further comprising:
means for normalizing the directional vector corresponding to the determined location of the vanishing point based on an intrinsic calibration matrix of the means for capturing the image.

27. The apparatus of claim 21, further comprising:
means for performing one or more calibration operations for at least one of a gyroscope or a magnetometer of the device based, at least in part, on the device orientation determined based, at least in part, on the computed directional vector and the gravity vector.

28. The apparatus of claim 21, wherein the means for determining the orientation of the device comprise:
means for identifying line segments in the captured image of the scene; and
means for determining the location of the vanishing point in the captured image based on the identified line segments.

29. A non-transitory processor readable media programmed with a set of instructions executable on a processor that, when executed, cause operations comprising:
capturing an image of a scene by an image capturing unit of a device that includes an accelerometer;
deriving a gravity vector from at least one measurement obtained from the accelerometer;
determining a location of a vanishing point in the captured image of the scene;
computing a directional vector based on a determined location of a vanishing point in the captured image of the scene;
in response to a determination that the computed directional vector is substantially parallel to the gravity vector, re-computing the directional vector based on another location of another vanishing point determined to be present in the captured image of the scene; and
determining an orientation of the device based, at least in part, on the computed directional vector and the gravity vector derived from the at least one measurement obtained from the accelerometer.

30. The processor readable media of claim 29, wherein determining the orientation of the device based on the computed directional vector and the gravity vector comprises:
determining the orientation based, at least in part, on a vector determined from location of a single vanishing point in the captured image and the gravity vector.

31. The processor readable media of claim 29, wherein determining the orientation of the device comprises:
determining the orientation of the device relative to a frame of reference of an indoor area in which the device is located.

32. The processor readable media of claim 31, wherein determining the orientation of the device comprises:
deriving a rotation matrix to transform location coordinates in the frame of reference of the indoor area to a frame of reference of the image capturing unit of the device.

33. The processor readable media of claim 32, further comprising instructions to cause further operations comprising:
determining based on the rotation matrix one or more of: roll of the device, pitch of the device, or yaw of the device.

34. The processor readable media of claim 29, further comprising instructions to cause further operations comprising:
normalizing the directional vector corresponding to the determined location of the vanishing point based on an intrinsic calibration matrix of the image capturing unit.

35. The processor readable media of claim 29, further comprising instructions to cause further operations comprising:
performing one or more calibration operations for at least one of a gyroscope or a magnetometer of the device based, at least in part, on the device orientation determined based, at least in part, on the computed directional vector and the gravity vector.

36. The processor readable media of claim 29, wherein determining the orientation of the device comprises:
identifying line segments in the captured image of the scene; and
determining the location of the vanishing point in the captured image based on the identified line segments.

* * * * *